US012225463B2

(12) United States Patent
Jiang

(10) Patent No.: US 12,225,463 B2
(45) Date of Patent: Feb. 11, 2025

(54) METHOD FOR RECEPTION MODE SWITCHING AND TERMINAL

(71) Applicant: VIVO MOBILE COMMUNICATION CO., LTD., Chang'an Dongguan (CN)

(72) Inventor: Dajie Jiang, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 477 days.

(21) Appl. No.: 17/360,309

(22) Filed: Jun. 28, 2021

(65) Prior Publication Data
US 2021/0329555 A1    Oct. 21, 2021

Related U.S. Application Data

(63) Continuation of application No. PCT/CN2019/121536, filed on Nov. 28, 2019.

(30) Foreign Application Priority Data

Dec. 28, 2018    (CN) .......................... 201811629002.1

(51) Int. Cl.
*H04W 52/02*    (2009.01)
*H04L 1/00*    (2006.01)
(Continued)

(52) U.S. Cl.
CPC ....... *H04W 52/0229* (2013.01); *H04L 1/0025* (2013.01); *H04W 68/005* (2013.01);
(Continued)

(58) Field of Classification Search
CPC ............ H04L 1/0025; H04W 52/0216; H04W 52/0229; H04W 68/005; H04W 72/0453;
(Continued)

(56) References Cited

U.S. PATENT DOCUMENTS 9,408,052 B2 *    8/2016    Drapkin .............. H04L 12/1895
2008/0090606 A1    4/2008    Hwang et al.
(Continued)

FOREIGN PATENT DOCUMENTS

CN    104219377 A    12/2014
CN    107528625 A    12/2017
(Continued)

OTHER PUBLICATIONS

International Search Report & Written Opinion related to Application No. PCT/CN2019/121536; reported on Jul. 8, 2021.
First Chinese Office Action for related Application No. 201811629002.1; reported on Sep. 25, 2020.
ZTE, "Discussion on UE Power Consumption Evaluation Model and Simulation Assumptions", Oct. 8-12, 2018, 3GPP TSG RAN WG1 Meeting #94, Chengdu, China.
Vivo, "Discussion on triggering adaptation of UE power consumption characteristics", Nov. 12-16, 2018, 3GPP TSG RAN WG1 #95, Spokane, USA.
(Continued)

*Primary Examiner* — Mansour Oveissi
(74) *Attorney, Agent, or Firm* — von Briesen & Roper, s.c.

(57) ABSTRACT

A method for reception mode switching and a terminal are provided. The method includes: switching a reception mode of the terminal from a first reception mode to a second reception mode if a reception mode switching event occurs wherein the first reception mode corresponds to a first quantity of receiving elements of the terminal, and the second reception mode corresponds to a second quantity of receiving elements of the terminal; wherein the receiving element is a receive antenna, a receive antenna port, a receiving port, a receiving channel, a receiving radio frequency channel, or a receive antenna panel.

15 Claims, 14 Drawing Sheets

(51) Int. Cl.
*H04W 68/00* (2009.01)
*H04W 72/0453* (2023.01)
*H04W 72/23* (2023.01)
*H04W 76/28* (2018.01)

(52) U.S. Cl.
CPC ....... *H04W 72/0453* (2013.01); *H04W 72/23* (2023.01); *H04W 76/28* (2018.02)

(58) Field of Classification Search
CPC ..... H04W 72/23; H04W 76/27; H04W 76/28; H04W 88/06; Y02D 30/70
See application file for complete search history.

(56) References Cited

U.S. PATENT DOCUMENTS

| | | | |
|---|---|---|---|
| 2012/0079302 A1* | 3/2012 | Ise | G06F 1/324 713/323 |
| 2012/0264473 A1 | 10/2012 | Mujtaba et al. | |
| 2013/0040671 A1 | 2/2013 | Zawaideh et al. | |
| 2013/0109391 A1 | 5/2013 | Lee et al. | |
| 2014/0301297 A1 | 10/2014 | Geirhofer et al. | |
| 2016/0007292 A1 | 1/2016 | Weng et al. | |
| 2016/0316378 A1 | 10/2016 | Su et al. | |
| 2017/0111495 A1 | 4/2017 | Yu et al. | |
| 2017/0366235 A1 | 12/2017 | Kim et al. | |
| 2018/0007734 A1 | 1/2018 | Kela et al. | |
| 2018/0262259 A1 | 9/2018 | Sano et al. | |
| 2018/0332533 A1 | 11/2018 | Bhattad et al. | |
| 2018/0367386 A1 | 12/2018 | Liao | |
| 2019/0037606 A1 | 1/2019 | Takeda et al. | |
| 2019/0350040 A1 | 11/2019 | Liu et al. | |
| 2020/0367288 A1* | 11/2020 | Dahlman | H04W 74/0833 |
| 2021/0195681 A1 | 6/2021 | Liu et al. | |

FOREIGN PATENT DOCUMENTS

| | | |
|---|---|---|
| JP | 2010109405 A | 5/2010 |
| JP | 2011018988 A | 1/2011 |
| JP | 2014042298 A | 3/2014 |
| JP | 2014527357 A | 10/2014 |
| JP | 2016518768 A | 6/2016 |
| WO | 2017033807 A1 | 3/2017 |
| WO | 2017122752 A1 | 7/2017 |
| WO | 2018066923 A1 | 4/2018 |
| WO | 2018126419 A1 | 7/2018 |
| WO | 2018144632 A1 | 8/2018 |
| WO | 2018174635 A1 | 9/2018 |
| WO | 2018175760 A1 | 9/2018 |
| WO | 2018204799 A1 | 11/2018 |

OTHER PUBLICATIONS

Samsung, "Triggering adaptation schemes", Nov. 12-16, 2018, 3GPP TSG RAN WG1 Meeting #95, Spokane, USA.

Qualcomm Incorporated, "Triggering Adaptation of UE Power Consumption Characteristics", Nov. 12-16, 2018, 3GPP TSG RAN WG1 Meeting #95, Spokane, Washington, USA.

Convida Wireless, "Triggering Adaptation of UE Power Consumption Characteristics", Nov. 12-7, 2018 16th, 3GPP TSG-RAN WG1 Meeting #95, Spokane, USA.

Second Japanese Office Action related to Application No. 2021-536352; reported on Mar. 13, 2023.

Japanese Notice of Reasons for Refusal for related Application No. 2021-536352; reported on Sep. 1, 2022.

Extended European search report related to Application No. 19905096.4 reported on Jan. 31, 2022.

R1-1811502, Source: Ericsson, "Triggering aspects of adaptation of NR UE power saving" Document for: Discussion and Decision, Agenda Item: 7.2.9.2.2, Release: 3GPP TSG-RAN WG1 Meeting #94bis, Oct. 8-12, 2018, Chengdu, China.

R1-18113621, Source: Nokia, Nokia Shanghai Bell, "On UE Power Saving Triggering Mechanisms" Document for: Discussion and Decision, Agenda Item: 7.2.9.2.2, Release: 3GPP TSG RAN WG1 Meeting #95, Nov. 12-16, 2018, Spokane, US.

R1-1705204, Source: Sony, "MTC UE Power Consumption Reduction in Idle Mode Paging" Document for: Discussion / Decision, Agenda Item: 7.2.6.2, Release: 3GPP TSG RAN WG1 Meeting #88bis, Apr. 3-7, 2017, Spokane, USA.

R1-1812330, Source: vivo, "Discussion on UE adaptation to the traffic and UE power consumption characteristics" Document for: Discussion and Decision, Agenda Item: 7.2.9.2.1, Release: 3GPP TSG RAN WG1 Meeting #95, Nov. 12-16, 2018, Spokane, USA.

R1-1813183, Source: Ericsson, "Triggers of NR UE power saving" Document for: Discussion and Decision, Agenda Item: 7.2.9.2.2, Release: 3GPP TSG-RAN WG1 Meeting #95, Nov. 12-16, 2018, Spokane, USA.

First Singapore Office Action related to Application No. 11202107093V; reported on Jun. 27, 2023.

R1-1812330—Source: vivo "Discussion on UE adaptation to the traffic and UE power consumption characteristics", Agenda Item: 7.2.9.2.1, Document for: Discussion and Decision, 3GPP TSG RAN WG1 Meeting #95, Spokane, USA, Nov. 12-16, 2018.

Japanese Reconsideration Report by Examiner before Appeal for related Application No. 2021-536352; reported on Feb. 14, 2024.

Huawei, Hisilicon, "Power saving schemes", Feb. 25-Mar. 1, 2019, 3GPP TSG RAN WG1 Meeting #96, Athens, Greece, R1-1901572.

* cited by examiner

METHOD FOR RECEPTION MODE SWITCHING AND TERMINAL

CROSS-REFERENCE TO RELATED APPLICATIONS

This application is continuation application of PCT International Application No. PCT/CN2019/121536 filed on Nov. 28, 2019, which claims priority to Chinese Patent Application No. 201811629002.1, filed in China on Dec. 28, 2018, the disclosures of which are incorporated herein by reference in their entireties.

TECHNICAL FIELD

Embodiments of this disclosure relate to the field of communications technologies, and in particular, to a method for reception mode switching and a terminal.

BACKGROUND

In a fifth generation (5G) mobile communications technology system, terminals operating in some specific bands (for example, 2.6 GHz, 3.5 GHz, or 4.8 GHz) are required to support four receive antennas. However, in some scenarios, two receive antennas can basically meet requirements. For example, in a case that downlink information is small data packets, requirements such as quality of service (QoS) can be met in two-antenna reception mode. If a terminal still uses four antennas for receiving the downlink information, unnecessary power consumption is caused for the terminal, not good for power saving of the terminal. In addition, for a terminal supporting a high band of 6 GHz or above, a plurality of antenna panels (Panel) may be installed, and the terminal may choose to receive a downlink signal by using one or more antenna panels.

In the related art, a base station may configure, by using radio resource control (RRC), media access control (MAC), or physical layer signaling, a terminal to operate on four receive antennas (4 receives (4Rx) for short) or two receive antennas (2 receives (2Rx) for short). However, configuration by the base station causes an increase in signalling of the base station, which is not conducive to reducing signalling of the base station.

SUMMARY

An objective of embodiments of this disclosure is to provide a method for reception mode switching and a terminal.

According to a first aspect in the embodiments of this disclosure, a method for reception mode switching is provided, applied to a terminal and including:
switching a reception mode of the terminal from a first reception mode to a second reception mode if a reception mode switching event occurs.

According to a second aspect in the embodiments of this disclosure, a terminal is further provided, including:
a processing module, configured to switch a reception mode of the terminal from a first reception mode to a second reception mode if a reception mode switching event occurs.

According to a third aspect in the embodiments of this disclosure, a terminal is further provided, including: a processor, a memory, and a program stored in the memory and capable of running on the processor. When the program is executed by the processor, the steps of the method for reception mode switching according to the first aspect are implemented.

According to a fourth aspect in the embodiments of this disclosure, a computer-readable storage medium is further provided. A computer program is stored in the computer-readable storage medium, and when the computer program is executed by a processor, the steps of the method for reception mode switching according to the first aspect are implemented.

In the embodiments of this disclosure, if the reception mode switching event occurs, the reception mode of the terminal is adjusted by switching from the first reception mode to the second reception mode; and if the reception mode switching event does not occur, the reception mode of the terminal is not adjusted. In this way, reception mode switching is automatically triggered for the terminal by occurrence of the reception mode switching event, thereby reducing signalling of the base station while reducing power consumption of the terminal or meeting performance requirements of the terminal.

BRIEF DESCRIPTION OF DRAWINGS

Other advantages and benefits will become apparent to those of ordinary skill in the art by reading the following detailed descriptions of optional implementations. The accompanying drawings are merely intended to illustrate the purposes of the optional implementations, and should not be construed as a limitation on this disclosure. Throughout the accompanying drawings, the same reference numerals represent the same components. In the accompanying drawings.

DESCRIPTION OF EMBODIMENTS

Figure 1:
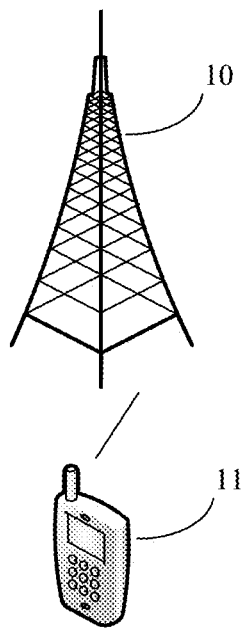
FIG. 1 is a schematic architectural diagram of a wireless communications system according to an embodiment of this disclosure.

The following clearly describes the technical solutions in the embodiments of this disclosure with reference to the accompanying drawings in the embodiments of this disclosure. Apparently, the described embodiments are some but not all of the embodiments of this disclosure. All other embodiments obtained by a person of ordinary skill in the art based on the embodiments of this disclosure shall fall within the protection scope of this disclosure.

The term "include" or any of its variants in the specification and claims of this application are intended to cover a non-exclusive inclusion, such that a process, a method, a system, a product, or a device that includes a series of steps or units not only includes those expressly listed steps or units but also includes other steps or units that are not expressly listed, or further includes elements inherent to such process, method, system, product, or device. In addition, in the specification and claims, the use of "and/or" represents presence of at least one of the connected objects, for example, "A and/or B" indicates the following three cases: A alone, B alone, or both A and B.

In the embodiments of this disclosure, the terms "an example" or "for example" are used to represent an example, an illustration, or a description. Any embodiment or design scheme described as "an example" or "for example" in the embodiments of this disclosure should not be construed as being more preferred or advantageous than other embodiments or design schemes. To be precise, the use of terms such as "an example" or "for example" is intended to present a related concept in a specific manner.

The technologies described in this specification are not limited to the 5G system and subsequent evolved communications systems. Technologies described in this specification are not limited to a long term evolution (LTE) or LTE-Advanced (LTE-A) system, and may also be applied to various wireless communications systems, for example, code division multiple access (CDMA), time division multiple access (TDMA), frequency division multiple access (FDMA), orthogonal frequency division multiple access (OFDMA), single-carrier frequency-division multiple access (SC-FDMA), and other systems.

The terms "system" and "network" are usually used interchangeably. The CDMA system can implement radio technologies such as CDMA2000 and Universal Terrestrial Radio Access (UTRA). The UTRA includes wideband CDMA (WCDMA) and other CDMA variants. The TDMA system can implement radio technologies such as the global system for mobile communications (GSM). The OFDMA system can implement radio technologies such as ultra mobile broadband (UMB), evolved UTRA (E-UTRA), IEEE 802.11 (Wi-Fi), IEEE 802.16 (WiMAX), IEEE 802.20, and Flash-OFDM. The UTRA and E-UTRA are parts of the universal mobile telecommunications system (UMTS). The LTE and more advanced LTE (such as LTE-A) are new UMTS releases that use the E-UTRA. The UTRA, E-UTRA, UMTS, LTE, LTE-A, and GSM are cited from descriptions of the documentation of the organization named "3rd Generation Partnership Project" (3GPP). The CDMA2000 and UMB are cited from descriptions of the documentation of the organization named "3rd Generation Partnership Project 2" (3GPP2). Techniques described in this specification may be used in the aforementioned systems and radio technologies, and can also be used in other systems and radio technologies.

The following describes the embodiments of this disclosure with reference to the accompanying drawings. A method for reception mode switching and a terminal that are provided by the embodiments of this disclosure may be applied to a wireless communications system. FIG. 1 is a schematic architectural diagram of a wireless communications system according to an embodiment of this disclosure. As shown in FIG. 1, the wireless communications system may include a network device 10 and a terminal. The terminal is denoted as user equipment (UE) 11, and the UE 11 may communicate (transmit signaling or transmit data) with the network device 10. In an actual application, connection between the foregoing devices may be wireless connection. To conveniently and intuitively represent a connection relationship between the devices, a solid line is used in FIG. 1. It should be noted that the communications system may include a plurality of UEs 11, and the network device 10 may communicate with the plurality of UEs 11.

The terminal provided in the embodiments of this disclosure may be a mobile phone, a tablet computer, a notebook computer, an ultra-mobile personal computer (UMPC), a netbook, a personal digital assistant (PDA), a mobile Internet device (MID), a wearable device (Wearable Device), an in-vehicle device, or the like.

The network device 10 provided in the embodiments of this disclosure may be a base station, and the base station may be a base station commonly used, or may be an evolved base station (eNB), or may be a network device in the 5G system, for example, a device (such as a next-generation base station (gNB) or a transmission and reception point (TRP).

Figure 2:
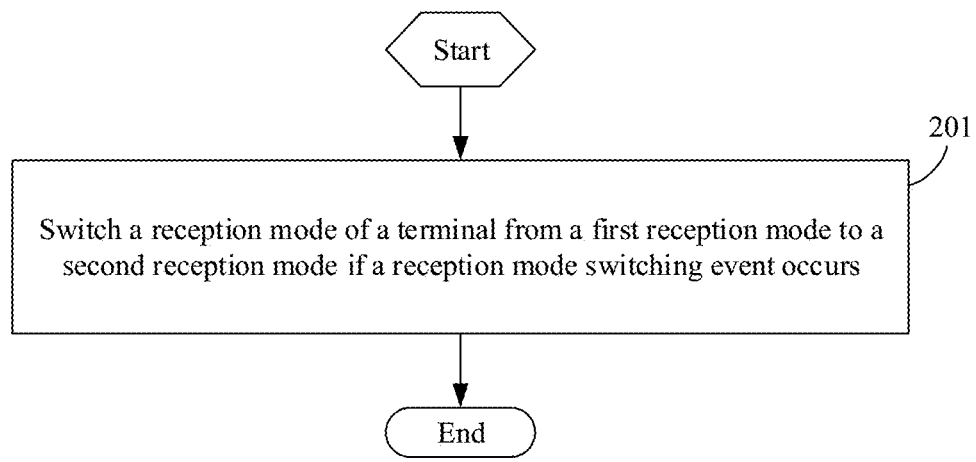
FIG. 2 is a flowchart 1 of a method for reception mode switching according to an embodiment of this disclosure.

Referring to FIG. 2, an embodiment of this disclosure provides a method for reception mode switching, and the method may be executed by a terminal. Specific steps are as follows:

Step 201: Switch a reception mode of the terminal from a first reception mode to a second reception mode if a reception mode switching event occurs.

Optionally, after step 201, the terminal may transmit related information of the second reception mode to a network side (for example, a base station).

In this embodiment of this disclosure, specific content of the reception mode switching event is not limited. The reception mode switching event may be a specific event related to reducing power consumption of the terminal or meeting performance requirements of the terminal. When the reception mode switching event is met, the terminal may switch the reception mode from the first reception mode to the second reception mode, so as to reduce the power consumption of the terminal or meet the performance requirements of the terminal. When the reception mode switching event is not met, a current reception mode is maintained.

In this embodiment of this disclosure, the reception mode of the terminal is a working mode in which the terminal receives signals by using a specific quantity of receiving elements. The receiving elements may be any one of a receive antenna, a receive antenna port, a receive port, a receive channel, a receive radio frequency channel, and a receive antenna panel.

A quantity of reception modes of the terminal may be greater than or equal to 2. For example, the reception mode of the terminal may include: the first reception mode and the second reception mode; for another example, the reception mode of the terminal may include: the first reception mode, the second reception mode, and a third reception mode. It can be understood that a reception mode switching manner used when the quantity of reception modes of the terminal is greater than 2 is similar to a reception mode switching manner used when the quantity of reception modes of the terminal equals 2. Details are not described herein.

In this embodiment of this disclosure, because the terminal automatically triggers the reception mode switching based on the reception mode switching event, a problem of an increase in signalling of the base station caused by configuration of the base station is avoided, thereby reducing the signalling of the base station while reducing the power consumption of the terminal or meeting the performance requirements of the terminal.

Figure 3:
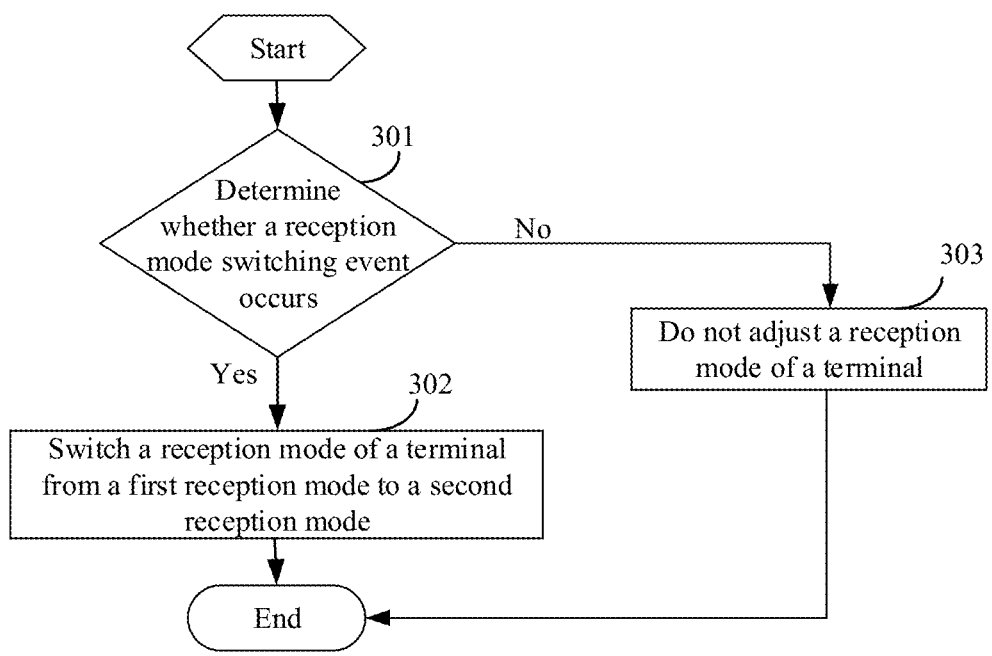
FIG. 3 is a flowchart 2 of a method for reception mode switching according to an embodiment of this disclosure.

Referring to FIG. 3, an embodiment of this disclosure provides a method for reception mode switching, and the method may be executed by a terminal. Specific steps are as follows:

Step 301: Determine whether a reception mode switching event occurs, and if a reception mode switching event occurs, perform step 302; otherwise, perform step 303.

Step 302: Switch a reception mode of the terminal from a first reception mode to a second reception mode.

In this way, because the terminal automatically triggers the reception mode switching based on the reception mode switching event, a problem of an increase in signalling of the base station caused by configuration of the base station is avoided, thereby reducing the signalling of the base station while reducing the power consumption of the terminal or meeting the performance requirements of the terminal.

Optionally, after step 302, the terminal may transmit related information of the second reception mode to a network side (for example, a base station). For example, the terminal notifies the network side (such as the base station) that the terminal has switched to the second reception mode.

Step 303: Do not adjust the reception mode of the terminal.

For example, the reception mode of the terminal remains the first reception mode, and is not switched to the second reception mode.

The first reception mode corresponds to a first quantity of receiving elements of the terminal, and the second reception mode corresponds to a second quantity of receiving elements of the terminal. For example, the first quantity may be 2 and the second quantity may be 4; or the first quantity may be 4 and the second quantity may be 2. Certainly, it can be understood that specific values of the first quantity and the second quantity are not limited in this embodiment of this disclosure.

For example, the reception mode of the terminal includes the first reception mode and the second reception mode, where the first reception mode corresponds to two receiving elements, and the second reception mode corresponds to four receiving elements. A current reception mode of the terminal is the first reception mode. Whether the reception mode switching event occurs is determined by using a process shown in FIG. 3. If the reception mode switching event occurs, the reception mode of the terminal is switched from the first reception mode to the second reception mode; and if the reception mode switching event does not occur, the reception mode of the terminal is not adjusted and the reception mode of the terminal remains the first reception mode. Alternatively, the quantity of receiving elements of the terminal in a first reception mode is the same as the quantity of receiving elements of the terminal in a second reception mode, only different in specific receiving elements. For example, the first reception mode corresponds to a first antenna panel, and the second reception mode corresponds to a second antenna panel.

It should be noted that in the foregoing example, the first reception mode may alternatively correspond to four receiving elements, and the second reception mode may correspond to two receiving elements.

In this embodiment of this disclosure, if the reception mode switching event occurs, the reception mode of the terminal is adjusted by switching from the first reception mode to the second reception mode; and if the reception mode switching event does not occur, the reception mode of the terminal is not adjusted. In this way, reception mode switching is automatically triggered for the terminal by occurrence of the reception mode switching event, thereby reducing signalling of the base station while reducing power consumption of the terminal or meeting performance requirements of the terminal.

Figure 4:
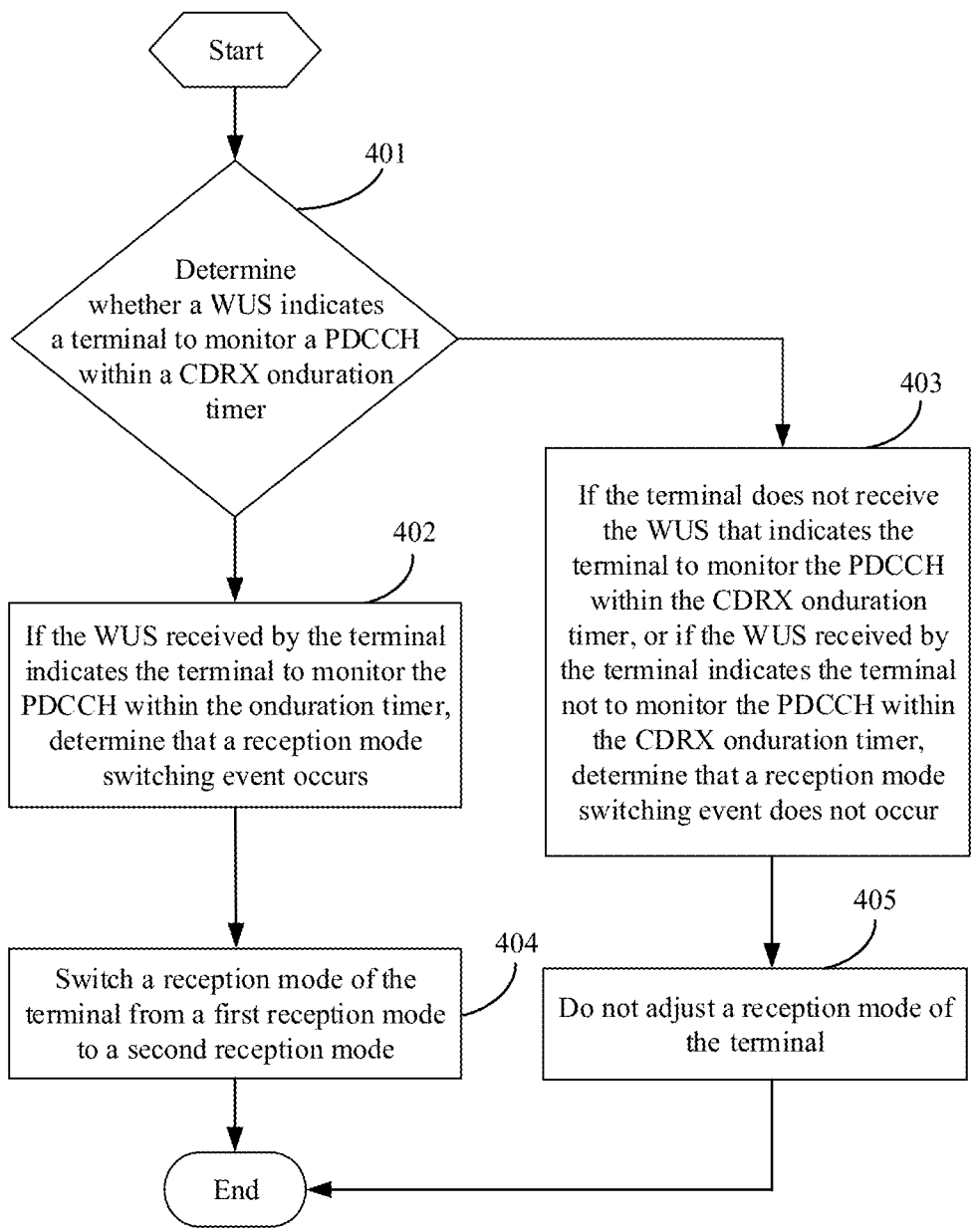
FIG. 4 is a flowchart 3 of a method for reception mode switching according to an embodiment of this disclosure.

Referring to FIG. 4, an embodiment of this disclosure further provides a method for reception mode switching, and the method may be executed by a terminal. Specific steps are as follows:

Step 401: Determine whether a wake-up signal (WUS) indicates the terminal to monitor a physical downlink control channel (PDCCH) within a CDRX onduration timer; and if the WUS indicates the terminal to monitor the PDCCH within the onduration timer, perform step 402; otherwise, perform step 403.

Optionally, the terminal may receive the WUS in a first reception mode. The WUS is before the connected state discontinuous reception (Connected Discontinuous Reception, CDRX) onduration timer (onduration timer) or within the onduration timer. The WUS is associated with the PDCCH within the onduration timer, and the WUS indicates the terminal whether to monitor the PDCCH.

Step 402: Determine that a reception mode switching event occurs, and then perform step 404.

Step 403: Determine that a reception mode switching event does not occur, and then perform step 405.

Step 404: Switch a reception mode of the terminal from the first reception mode to a second reception mode.

Optionally, after step 404, the terminal may transmit related information of the second reception mode to a network side. For example, the terminal notifies the network side (such as a base station) that the terminal has switched to the second reception mode.

Step 405: Do not adjust the reception mode of the terminal.

If the terminal does not receive the WUS that indicates the terminal to monitor the PDCCH within the CDRX onduration timer, it is determined that the reception mode switching event does not occur, and the reception mode of the terminal is not adjusted; or if the WUS received by the terminal indicates the terminal not to monitor the PDCCH within CDRX onduration timer, it is determined that the reception mode switching event does not occur, and the reception mode of the terminal is not adjusted. For example, the reception mode of the terminal remains the first reception mode, and is not switched to the second reception mode.

The first reception mode corresponds to a first quantity of receiving elements of the terminal, and the second reception mode corresponds to a second quantity of receiving elements of the terminal. The first quantity is less than the second quantity. For example, the first quantity may be 2, and the second quantity may be 4. Certainly, this is not limited thereto. Alternatively, the quantity of receiving elements of the terminal in a first reception mode is the same as the quantity of receiving elements of the terminal in a second reception mode, only different in specific receiving elements. For example, the first reception mode corresponds to a first antenna panel, and the second reception mode corresponds to a second antenna panel.

The method shown in FIG. 4 may be applied to the following scenario: the WUS is before or within the CDRX onduration timer, the terminal monitor the WUS, and the WUS indicates the terminal whether to monitor the PDCCH within the CDRX onduration timer. Based on a WUS monitoring result, the terminal monitors the PDCCH within the onduration timer or does not monitor the PDCCH within the onduration timer.

For example, in CDRX, the terminal receives the WUS through 2Rx (two receives, that is, two receive antennas). If the WUS received by the terminal indicates the terminal to monitor the PDCCH within the CDRX onduration timer, adaptive antenna switching is triggered (for example, switching to 4RX); otherwise, switching is not performed (for example, not switching to 4Rx). Optionally, after switching to 4Rx (4 receives, that is, 4 receive antennas), the terminal reports 4Rx-related information to a next generation NodeB (gNB).

In this embodiment of this disclosure, if the reception mode switching event occurs, the reception mode of the terminal is adjusted by switching from the first reception mode to the second reception mode; and if the reception mode switching event does not occur, the reception mode of the terminal is not adjusted. In this way, reception mode switching is automatically triggered for the terminal by occurrence of the reception mode switching event, thereby reducing signalling of the base station while reducing power consumption of the terminal or meeting performance requirements of the terminal.

Figure 5:
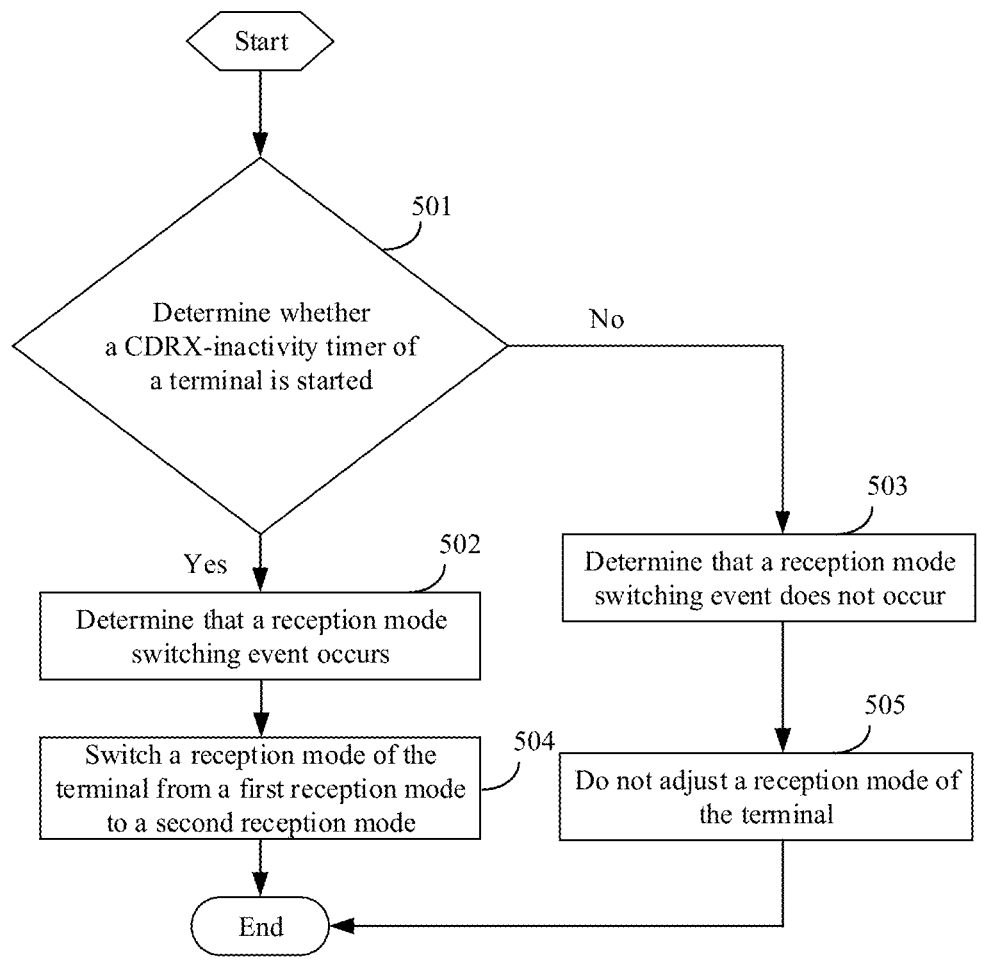
FIG. 5 is a flowchart 4 of a method for reception mode switching according to an embodiment of this disclosure.

Referring to FIG. 5, an embodiment of this disclosure further provides a method for reception mode switching, and the method may be executed by a terminal. Specific steps are as follows:

Step 501: Determine whether a connected state discontinuous reception-inactivity timer (CDRX-Inactivity timer) of the terminal is started, where the terminal operates in a first reception mode; and if the CDRX-inactivity timer is started, perform step 502; otherwise, perform step 503.

Step 502: Determine that a reception mode switching event occurs, and then perform step 504.

Step 503: Determine that a reception mode switching event does not occur, and then perform step 505.

Step 504: Switch a reception mode of the terminal from the first reception mode to a second reception mode.

Optionally, after step 504, the terminal may transmit related information of the second reception mode to a network side. For example, the terminal notifies the network side (such as a base station) that the terminal has switched to the second reception mode.

Step 505: Do not adjust the reception mode of the terminal.

If the CDRX-inactivity timer of the terminal is not started, it is determined that the reception mode switching event does not occur, and the reception mode of the terminal is not adjusted. For example, the reception mode of the terminal remains the first reception mode, and is not switched to the second reception mode.

The first reception mode corresponds to a first quantity of receiving elements of the terminal, and the second reception mode corresponds to a second quantity of receiving elements of the terminal. The first quantity is less than the second quantity. For example, the first quantity may be 2, and the second quantity may be 4. Certainly, this is not limited thereto. Alternatively, the quantity of receiving elements of the terminal in a first reception mode is the same as the quantity of receiving elements of the terminal in a second reception mode, only different in specific receiving elements. For example, the first reception mode corresponds to a first antenna panel, and the second reception mode corresponds to a second antenna panel.

The method shown in FIG. 5 may be applied to the following scenario: During the CDRX onduration timer, the terminal monitors a PDCCH. If scheduling information carried by the PDCCH is received, the CDRX-inactivity timer is started and monitoring on the PDCCH continues; if the scheduling information carried by the PDCCH is not received, the terminal enters discontinuous reception (DRX) off (OFF) after the onduration timer expires.

For example, during the onduration timer, when the CDRX-inactivity timer is not started, the terminal operates at 2Rx, for example, receiving, through 2Rx, information carried by the PDCCH. If the CDRX-inactivity timer is started, adaptive antenna switching is triggered (for example, switching to 4RX); otherwise, switching is not performed (for example, not switching to 4Rx). Optionally, after switching to 4Rx, the terminal reports 4Rx-related information to a gNB.

In this embodiment of this disclosure, if the reception mode switching event occurs, the reception mode of the terminal is adjusted by switching from the first reception mode to the second reception mode; and if the reception mode switching event does not occur, the reception mode of the terminal is not adjusted. In this way, reception mode switching is automatically triggered for the terminal by occurrence of the reception mode switching event, thereby reducing signalling of the base station while reducing power consumption of the terminal or meeting performance requirements of the terminal.

Figure 6:
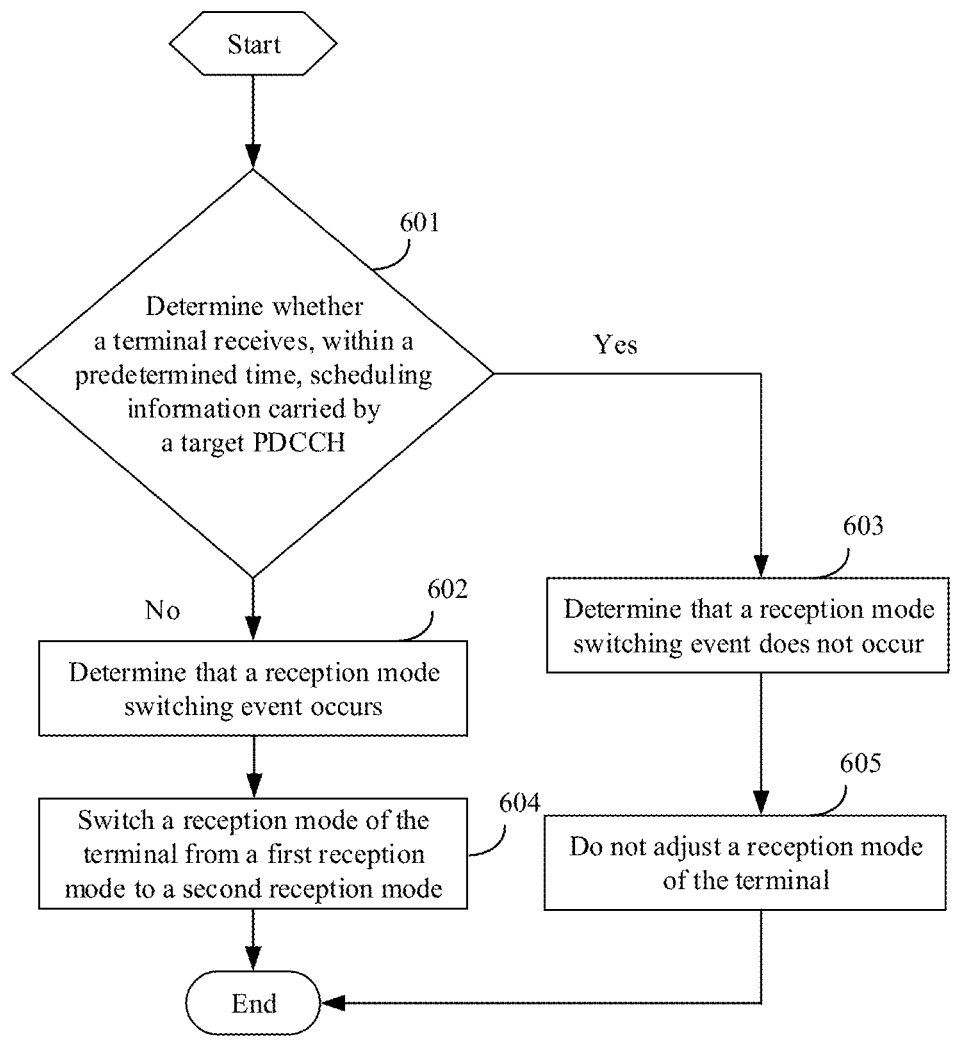
FIG. 6 is a flowchart 5 of a method for reception mode switching according to an embodiment of this disclosure.

Referring to FIG. 6, an embodiment of this disclosure further provides a method for reception mode switching, and the method may be executed by a terminal. Specific steps are as follows:

Step 601: Determine whether the terminal receives, within a predetermined time, scheduling information carried by a target PDCCH, where the terminal operates in a first reception mode; and if the scheduling information carried by the PDCCH is not received within the predetermined time, perform step 602; otherwise, perform step 603.

Optionally, cyclic redundancy check (CRC) of the target PDCCH is scrambled by a cell radio network temporary identifier (C-RNTI) or a configuration scheduling radio network temporary identifier (CS-RNTI).

It should be noted that the predetermined time is not specifically limited in this embodiment of this disclosure. Optionally, the predetermined time may be network-configured or protocol-prescribed.

Step 602: Determine that a reception mode switching event occurs, and then perform step 604.

Step 603: Determine that a reception mode switching event does not occur, and then perform step 605.

Step 604: Switch a reception mode of the terminal from the first reception mode to a second reception mode.

Optionally, after step 604, the terminal may transmit related information of the second reception mode to a network side. For example, the terminal notifies the network side (such as a base station) that the terminal has switched to the second reception mode.

Step 605: Do not adjust the reception mode of the terminal.

If the terminal does not receive, within the predetermined time, the scheduling information carried by the target PDCCH, it is determined that the reception mode switching event does not occur, and the reception mode of the terminal is not adjusted. For example, the reception mode of the terminal remains the first reception mode, and is not switched to the second reception mode.

The first reception mode corresponds to a first quantity of receiving elements of the terminal, and the second reception mode corresponds to a second quantity of receiving elements of the terminal. The first quantity is greater than the second quantity. For example, the first quantity may be 4, and the second quantity may be 2. Certainly, this is not limited thereto. Alternatively, the quantity of receiving elements of the terminal in a first reception mode is the same as the quantity of receiving elements of the terminal in a second reception mode, only different in specific receiving elements. For example, the first reception mode corresponds to a first antenna panel, and the second reception mode corresponds to a second antenna panel.

The method shown in FIG. 6 may be applied to the following scenario: In a radio resource control (RRC) active mode, the terminal receives, within a specific timer (timer) on an active (active) bandwidth part (BWP), no scheduling information carried by the PDCCH, the terminal switches to a default (default) downlink BWP.

For example, in the RRC active mode, when the terminal operates at 4Rx, and the terminal receives, within the specific timer on the active BWP, no scheduling information carried by the PDCCH, the terminal switches to the default downlink BWP. In addition, adaptive antenna switching is triggered, and the terminal switches to a mode with a smaller quantity of antennas (for example, assuming that the terminal operates at 4Rx when the terminal operates on the active BWP, the terminal switches to 2Rx); otherwise, 4Rx remains.

In this embodiment of this disclosure, if the reception mode switching event occurs, the reception mode of the terminal is adjusted by switching from the first reception mode to the second reception mode; and if the reception mode switching event does not occur, the reception mode of the terminal is not adjusted. In this way, reception mode switching is automatically triggered for the terminal by occurrence of the reception mode switching event, thereby reducing signalling of the base station while reducing power consumption of the terminal or meeting performance requirements of the terminal.

Figure 7:
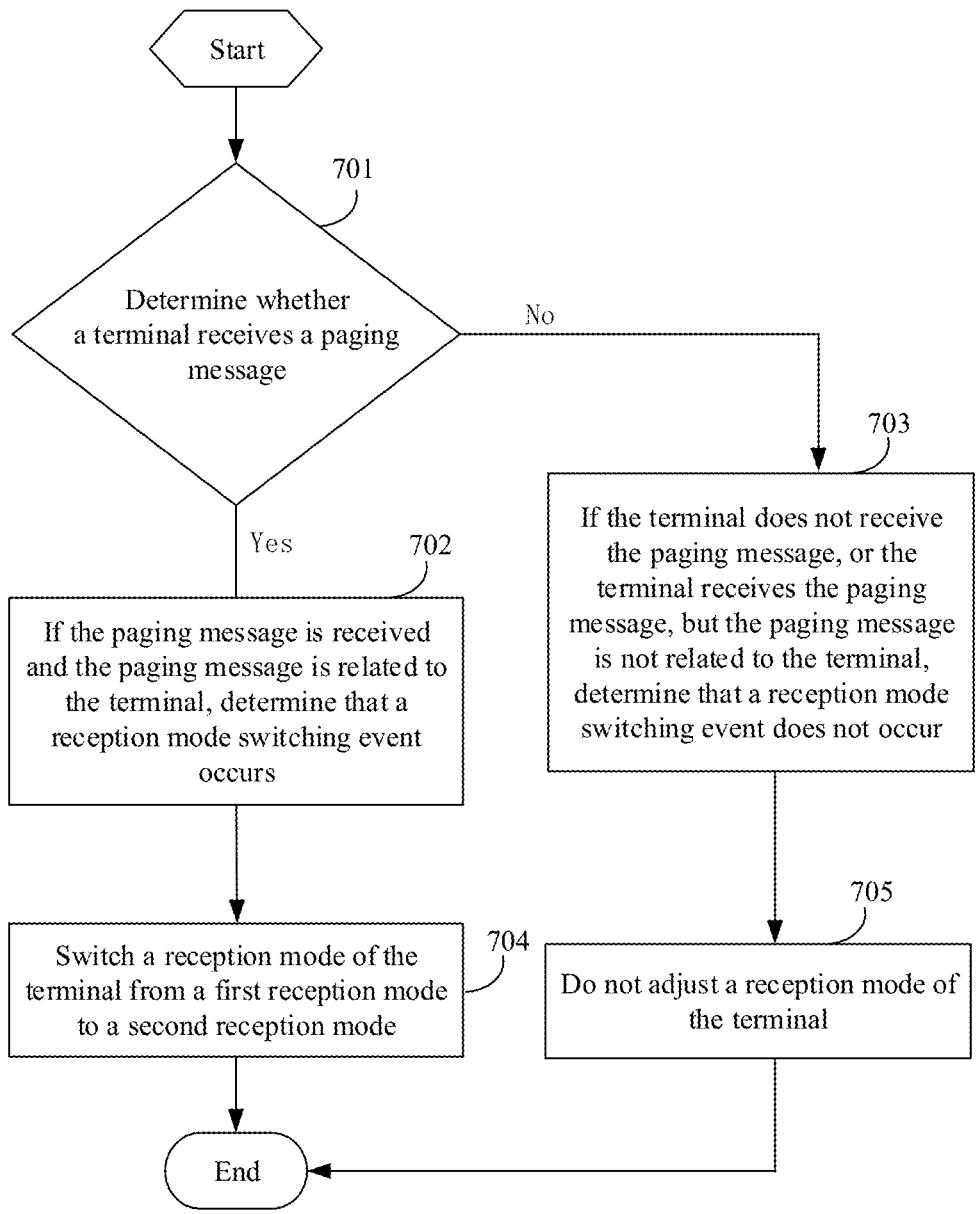
FIG. 7 is a flowchart 6 of a method for reception mode switching according to an embodiment of this disclosure.

Referring to FIG. 7, an embodiment of this disclosure further provides a method for reception mode switching, and the method may be executed by a terminal. Specific steps are as follows:

Step 701: Determine whether the terminal receives a paging (paging) message, where the terminal operates in a first reception mode; and if a paging message is received and the paging message is related to the terminal, perform step 702; otherwise, perform step 703.

Step 702: Determine that a reception mode switching event occurs, and then perform step 704.

Step 703: Determine that a reception mode switching event does not occur, and then perform step 705.

Step 704: Switch a reception mode of the terminal from the first reception mode to a second reception mode.

Optionally, after step 704, the terminal may transmit related information of the second reception mode to a network side. For example, the terminal notifies the network side (such as a base station) that the terminal has switched to the second reception mode.

Step 705: Do not adjust the reception mode of the terminal.

For example, if the terminal does not receive the paging message, it is determined that the reception mode switching event does not occur, and the reception mode of the terminal is not adjusted; or if the terminal receives the paging message, but the paging message is not related to the terminal, it is determined that the reception mode switching event does not occur, and the reception mode of the terminal is not adjusted. For example, the reception mode of the terminal remains the first reception mode, and is not switched to the second reception mode.

The first reception mode corresponds to a first quantity of receiving elements of the terminal, and the second reception mode corresponds to a second quantity of receiving elements of the terminal. The first quantity is less than the second quantity. For example, the first quantity may be 2, and the second quantity may be 4. Certainly, this is not limited thereto. Alternatively, the quantity of receiving elements of the terminal in a first reception mode is the same as the quantity of receiving elements of the terminal in a second reception mode, only different in specific receiving elements. For example, the first reception mode corresponds to a first antenna panel, and the second reception mode corresponds to a second antenna panel.

In this embodiment of this disclosure, that the paging message is related to the terminal may include at least one of the following:

information transmitted on a PDCCH or a physical downlink shared channel (PDSCH) for the paging message includes information related to an identifier (ID) of the terminal, the paging message indicates a system information update, the paging message indicates an earthquake and tsunami warning system (ETWS), and the paging message indicates a commercial mobile alarm system (CMAS).

In this embodiment of this disclosure, that the paging message is not related to the terminal excludes any one of the following:

the information transmitted on the PDCCH or PDSCH for the paging message includes the information related to the ID of the terminal, the paging message indicates the system information update, the paging message indicates the ETWS, and the paging message indicates the CMAS.

The method shown in FIG. 7 may be applied to the following scenario: In an RRC idle mode or active mode (RRC idle/active mode), the terminal monitors the paging message at regular intervals, and the paging message indicates a system information (SI) update or presence of downlink data to the terminal.

For example, the terminal receives the paging message through 2Rx, and if the system pages the terminal, adaptive antenna switching is triggered (for example, switching to 4Rx) to receive subsequent information; otherwise, 2Rx remains.

For example, the terminal receives the paging message through 2Rx, and if the system pages the terminal and a paging cause is not a system information update, adaptive antenna switching is triggered (for example, switching to 4Rx); otherwise, 2Rx remains.

In this embodiment of this disclosure, if the reception mode switching event occurs, the reception mode of the terminal is adjusted by switching from the first reception mode to the second reception mode; and if the reception mode switching event does not occur, the reception mode of the terminal is not adjusted. In this way, reception mode switching is automatically triggered for the terminal by occurrence of the reception mode switching event, thereby reducing signalling of the base station while reducing power consumption of the terminal or meeting performance requirements of the terminal.

Figure 8:
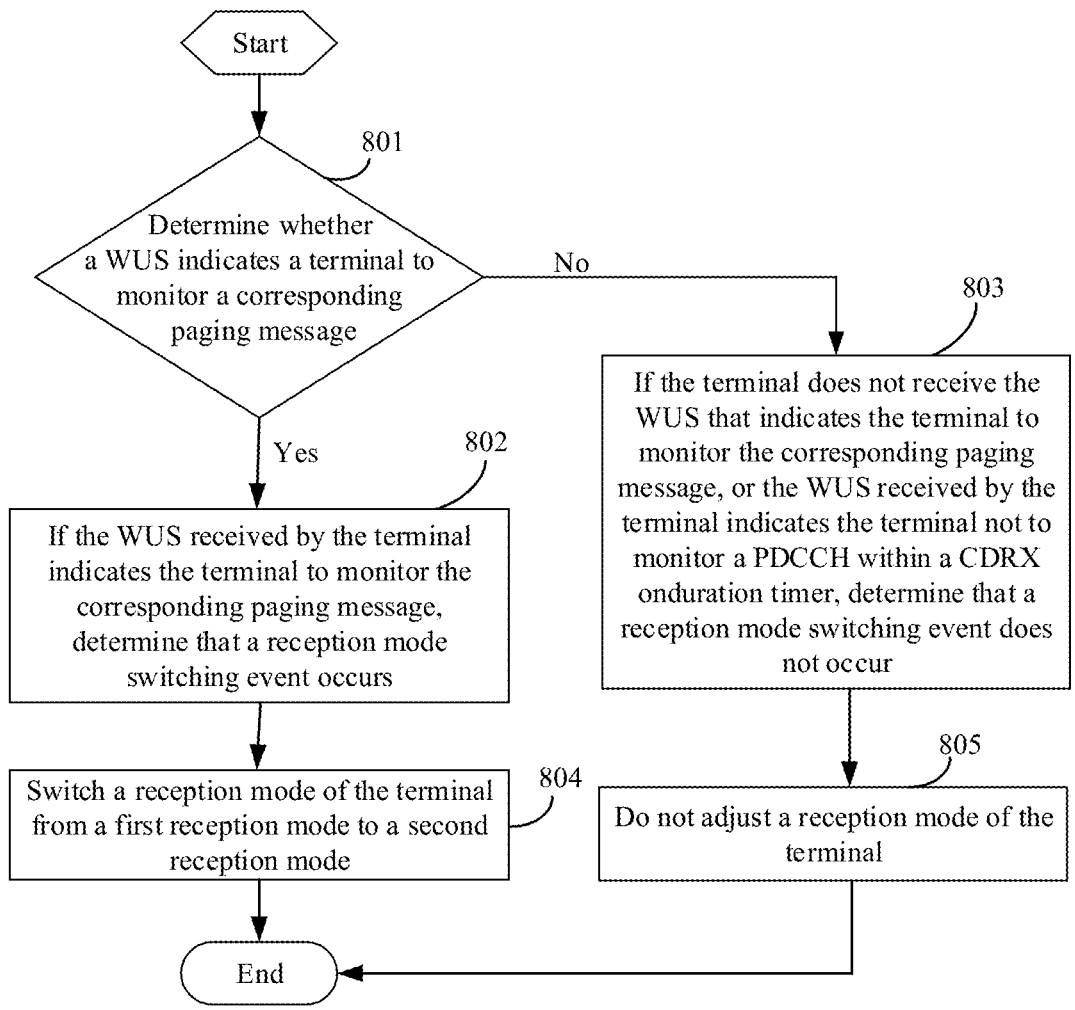
FIG. 8 is a flowchart 7 of a method for reception mode switching according to an embodiment of this disclosure.

Referring to FIG. 8, an embodiment of this disclosure further provides a method for reception mode switching, and the method may be executed by a terminal. Specific steps are as follows:

Step 801: Determine whether a WUS indicates the terminal to monitor a corresponding paging message; and if the WUS received by the terminal indicates the terminal to monitor the corresponding paging message, perform step 802; otherwise, perform step 803.

Optionally, the WUS is received in a first reception mode, the WUS is before a paging occasion (PO), the WUS is associated with the paging occasion, and the WUS indicates the terminal whether to monitor a PDCCH.

Step 802: Determine that a reception mode switching event occurs, and then perform step 804.

Step 803: Determine that a reception mode switching event does not occur, and then perform step 805.

Step 804: Switch a reception mode of the terminal from the first reception mode to a second reception mode.

Optionally, after step 804, related information of the second reception mode is transmitted to a network side. For example, the terminal notifies the network side (such as a base station) that the terminal has switched to the second reception mode.

Step 805: Do not adjust the reception mode of the terminal.

If the terminal does not receive the WUS that indicates the terminal to monitor the corresponding paging message, it is determined that the reception mode switching event does not occur, and the reception mode of the terminal is not adjusted; or if the WUS received by the terminal indicates the terminal not to monitor the corresponding paging message, it is determined that the reception mode switching event does not occur, and the reception mode of the terminal is not adjusted. For example, the reception mode of the terminal remains the first reception mode, and is not switched to the second reception mode.

The first reception mode corresponds to a first quantity of receiving elements of the terminal, and the second reception mode corresponds to a second quantity of receiving elements of the terminal. The first quantity is less than the second quantity. For example, the first quantity may be 2, and the second quantity may be 4. Certainly, this is not limited thereto. Alternatively, the quantity of receiving elements of the terminal in a first reception mode is the same as the quantity of receiving elements of the terminal in a second reception mode, only different in specific receiving elements. For example, the first reception mode corresponds to a first antenna panel, and the second reception mode corresponds to a second antenna panel.

The method shown in FIG. 8 may be applied to the following scenario: In an RRC idle/active mode, the terminal monitors, at regular intervals (for example, in each paging cycle (paging cycle)), the WUS that is before the paging occasion (PO), where the WUS indicates the terminal whether to monitor the corresponding paging message.

For example, the terminal receives, through 2Rx, the WUS that is before the PO. If the WUS received by the terminal indicates the terminal to monitor the corresponding paging message, adaptive antenna switching is triggered to switch to 4Rx for receiving the paging message; otherwise, switching to 4Rx does not need to be performed.

In this embodiment of this disclosure, if the reception mode switching event occurs, the reception mode of the terminal is adjusted by switching from the first reception mode to the second reception mode; and if the reception mode switching event does not occur, the reception mode of the terminal is not adjusted. In this way, reception mode switching is automatically triggered for the terminal by occurrence of the reception mode switching event, thereby reducing signalling of the base station while reducing power consumption of the terminal or meeting performance requirements of the terminal.

Figure 9:
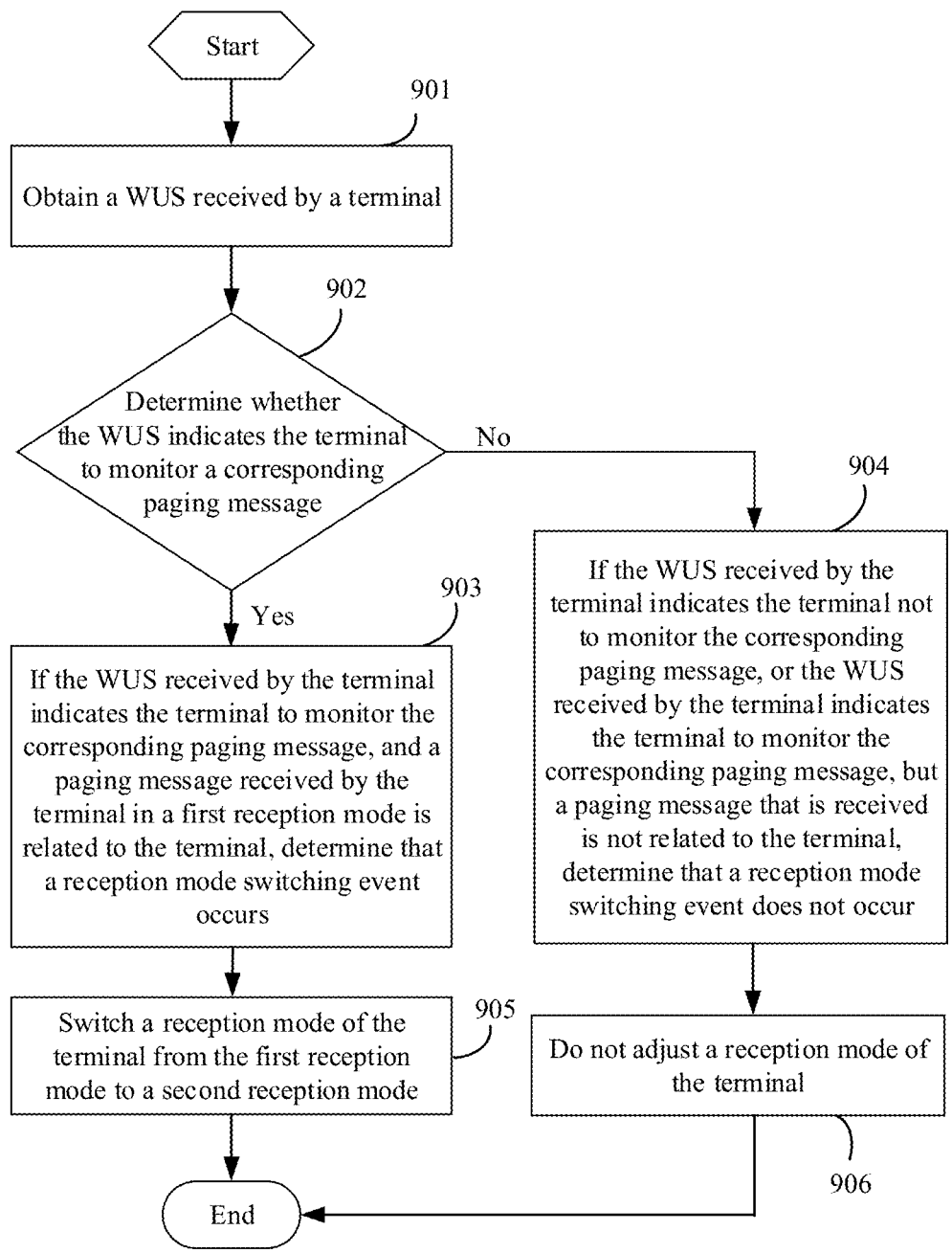
FIG. 9 is a flowchart 8 of a method for reception mode switching according to an embodiment of this disclosure.

Referring to FIG. 9, an embodiment of this disclosure further provides a method for reception mode switching, and the method may be executed by a terminal. Specific steps are as follows:

Step 901: Obtain a WUS received by the terminal, where the WUS is before a paging occasion, the terminal operates in a first reception mode, the WUS is associated with the paging occasion, and the WUS indicates the terminal whether to monitor a PDCCH.

Step 902: Determine whether the WUS indicates the terminal to monitor a corresponding paging message; and if the WUS indicates the terminal to monitor the corresponding paging message, and a paging message received by the terminal in the first reception mode is related to the terminal, perform step 903; otherwise, perform step 904.

Step 903: Determine that a reception mode switching event occurs, and then perform step 905.

Step 904: Determine that a reception mode switching event does not occur, and then perform step 906.

Step 905: Switch a reception mode of the terminal from the first reception mode to a second reception mode.

Optionally, after step 905, the terminal may transmit related information of the second reception mode to a network side. For example, the terminal notifies the network side (such as a base station) that the terminal has switched to the second reception mode.

Step 906: Do not adjust the reception mode of the terminal.

For example, if the WUS received by the terminal indicates the terminal not to monitor the corresponding paging message, it is determined that the reception mode switching event does not occur, and the reception mode of the terminal is not adjusted; or if the WUS received by the terminal indicates the terminal to monitor the corresponding paging message, but the paging message that is received is not related to the terminal, it is determined that the reception mode switching event does not occur, and the reception mode of the terminal is not adjusted. For example, the reception mode of the terminal remains the first reception mode, and is not switched to the second reception mode.

It should be noted that if the terminal does not receive the WUS that indicates the terminal to monitor the corresponding paging message, it is determined that the reception mode switching event does not occur, and the reception mode of the terminal is not adjusted.

The first reception mode corresponds to a first quantity of receiving elements of the terminal, and the second reception mode corresponds to a second quantity of receiving elements of the terminal. The first quantity is less than the second quantity. For example, the first quantity may be 2, and the second quantity may be 4. Certainly, this is not limited thereto. Alternatively, the quantity of receiving elements of the terminal in a first reception mode is the same as the quantity of receiving elements of the terminal in a second reception mode, only different in specific receiving elements. For example, the first reception mode corresponds to a first antenna panel, and the second reception mode corresponds to a second antenna panel.

In this embodiment of this disclosure, that the paging message is related to the terminal may include at least one of the following:

the information transmitted on the PDCCH or PDSCH for the paging message includes the information related to the ID of the terminal, the paging message indicates the system information update, the paging message indicates the ETWS, and the paging message indicates the CMAS.

In this embodiment of this disclosure, that the paging message is not related to the terminal excludes any one of the following:

the information transmitted on the PDCCH or PDSCH for the paging message includes the information related to the ID of the terminal, the paging message indicates the system information update, the paging message indicates the ETWS, and the paging message indicates the CMAS.

The method shown in FIG. 9 may be applied to the following scenario: In an RRC idle/active mode, the terminal monitors, at regular intervals (for example, in each paging cycle (paging cycle)), the WUS that is before the paging occasion (PO), where the WUS indicates the terminal whether to monitor the corresponding paging message.

For example, the terminal receives, through 2Rx, the WUS that is before the PO. If the WUS indicates the terminal to monitor the corresponding paging message, the terminal receives the paging message through 2Rx. If the paging message indicates that a system pages the terminal, adaptive antenna switching is triggered to switch to 4Rx for receiving subsequent information; otherwise, 2Rx remains.

For example, the terminal receives, through 2Rx, the WUS that is before the PO. If the WUS indicates the terminal to monitor the corresponding paging message, the terminal receives the paging message through 2Rx. If the paging message indicates that a system pages the terminal, and a paging cause is not a system information update, adaptive antenna switching is triggered to switch to 4Rx for receiving subsequent information; otherwise, 2Rx remains.

In this embodiment of this disclosure, if the reception mode switching event occurs, the reception mode of the terminal is adjusted by switching from the first reception mode to the second reception mode; and if the reception mode switching event does not occur, the reception mode of the terminal is not adjusted. In this way, reception mode switching is automatically triggered for the terminal by occurrence of the reception mode switching event, thereby reducing signalling of the base station while reducing power consumption of the terminal or meeting performance requirements of the terminal.

Figure 10:
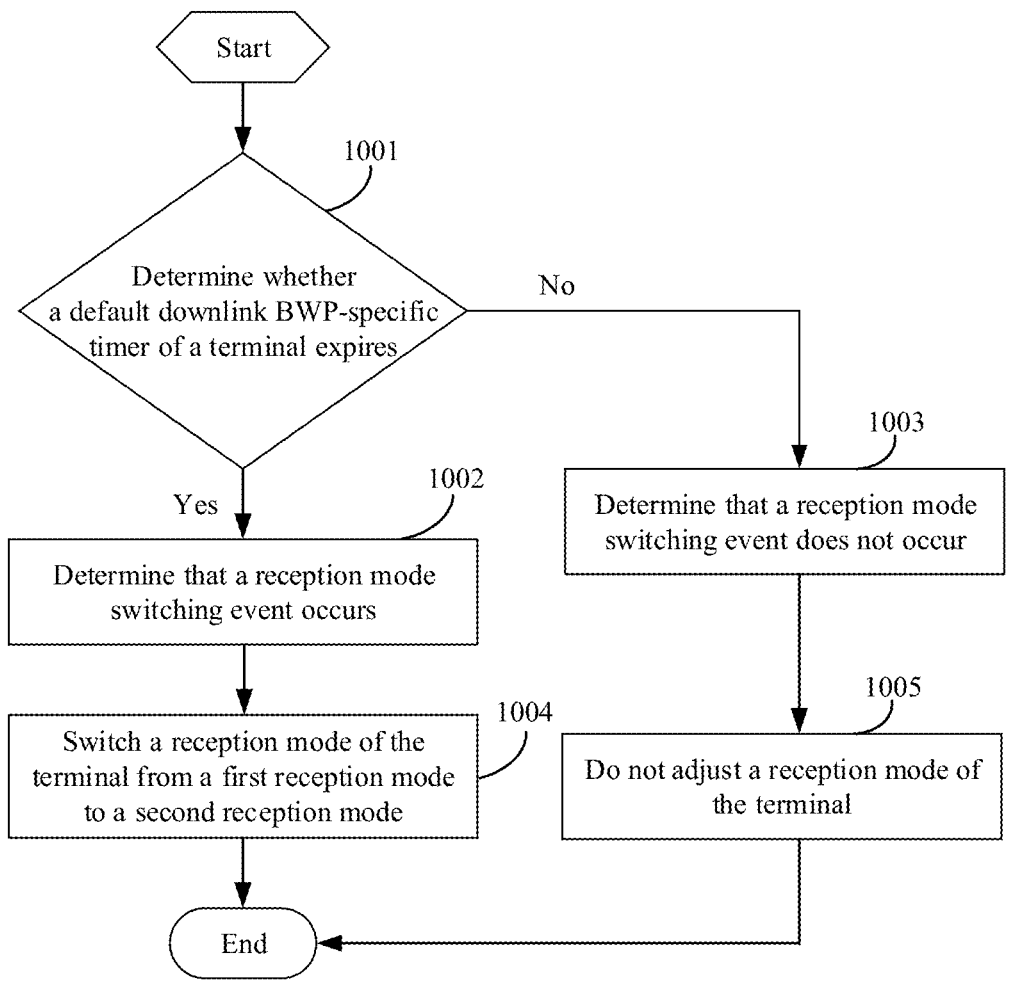
FIG. 10 is a flowchart 9 of a method for reception mode switching according to an embodiment of this disclosure.

Referring to FIG. 10, an embodiment of this disclosure further provides a method for reception mode switching, and the method may be executed by a terminal. Specific steps are as follows:

Step 1001: Determine whether a default downlink bandwidth part (default Downlink BWP)-related timer of the terminal expires, where the terminal operates in a first reception mode and the terminal is in an RRC connected (RRC connected) mode; and if the timer expires, perform step 1002; otherwise, perform step 1003.

Step 1002: Determine that a reception mode switching event occurs, and then perform step 1004.

Step 1003: Determine that a reception mode switching event does not occur, and then perform step 1005.

Step 1004: Switch a reception mode of the terminal from the first reception mode to a second reception mode.

Optionally, after step 1004, the terminal may transmit related information of the second reception mode to a network side. For example, the terminal notifies the network side (such as a base station) that the terminal has switched to the second reception mode.

Step 1005: Do not adjust the reception mode of the terminal.

If the default downlink BWP-related timer of the terminal does not expire, it is determined that the reception mode switching event does not occur, and the reception mode of the terminal is not adjusted. For example, the reception mode of the terminal remains the first reception mode, and is not switched to the second reception mode.

The first reception mode corresponds to a first quantity of receiving elements of the terminal, and the second reception mode corresponds to a second quantity of receiving elements of the terminal. The first quantity is greater than the second quantity. For example, the first quantity may be 4, and the second quantity may be 2. Certainly, this is not limited thereto. Alternatively, the quantity of receiving elements of the terminal in a first reception mode is the same as the quantity of receiving elements of the terminal in a second reception mode, only different in specific receiving elements. For example, the first reception mode corresponds to a first antenna panel, and the second reception mode corresponds to a second antenna panel.

For example, the terminal is in the RRC connected (RRC connected) mode and configured with 4Rx, and if scheduling information carried by a PDCCH is not received within the timer (timer), adaptive antenna switching is triggered to switch to 2Rx; otherwise, 4Rx remains.

In this embodiment of this disclosure, if the reception mode switching event occurs, the reception mode of the terminal is adjusted by switching from the first reception mode to the second reception mode; and if the reception mode switching event does not occur, the reception mode of the terminal is not adjusted. In this way, reception mode switching is automatically triggered for the terminal by occurrence of the reception mode switching event, thereby reducing signalling of the base station while reducing power consumption of the terminal or meeting performance requirements of the terminal.

Figure 11:
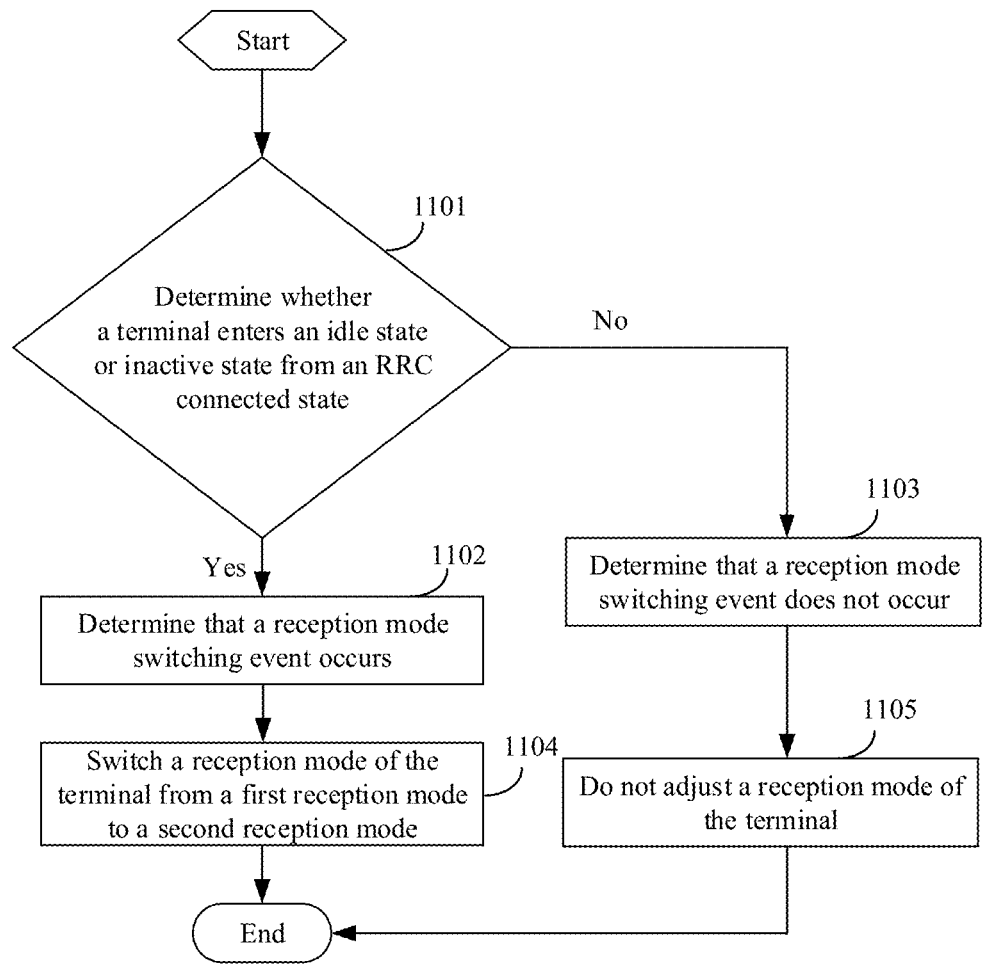
FIG. 11 is a flowchart 10 of a method for reception mode switching according to an embodiment of this disclosure.

Referring to FIG. 11, an embodiment of this disclosure further provides a method for reception mode switching, and the method may be executed by a terminal. Specific steps are as follows:

Step 1101: Determine whether the terminal enters an idle state or inactive state from an RRC connected state, where a first reception mode is configured for the terminal that is in the RRC connected state; and if the terminal enters the idle state or the inactive state from the RRC connected state, perform step 1102; otherwise, perform step 1103.

Step 1102: Determine that a reception mode switching event occurs, and then perform step 1104.

Step 1103: Determine that a reception mode switching event does not occur, and then perform step 1105.

Step 1104: Switch a reception mode of the terminal from the first reception mode to a second reception mode.

Optionally, after step 1104, the terminal may transmit related information of the second reception mode to a network side. For example, the terminal notifies the network side (such as a base station) that the terminal has switched to the second reception mode.

Step 1105: Do not adjust the reception mode of the terminal.

For example, the reception mode of the terminal remains the first reception mode, and is not switched to the second reception mode.

The first reception mode corresponds to a first quantity of receiving elements of the terminal, and the second reception mode corresponds to a second quantity of receiving elements of the terminal. The first quantity is greater than the second quantity. For example, the first quantity may be 4, and the second quantity may be 2. Certainly, this is not limited thereto. Alternatively, the quantity of receiving elements of the terminal in a first reception mode is the same as the quantity of receiving elements of the terminal in a second reception mode, only different in specific receiving elements. For example, the first reception mode corresponds to a first antenna panel, and the second reception mode corresponds to a second antenna panel.

For example, the terminal is in the RRC connected state and is configured with 4Rx, and if the terminal enters the idle (idle) state or the inactive (inactive) state, adaptive antenna switching is triggered to switch to 2Rx.

In this embodiment of this disclosure, if the reception mode switching event occurs, the reception mode of the terminal is adjusted by switching from the first reception mode to the second reception mode; and if the reception mode switching event does not occur, the reception mode of the terminal is not adjusted. In this way, reception mode switching is automatically triggered for the terminal by occurrence of the reception mode switching event, thereby reducing signalling of the base station while reducing power consumption of the terminal or meeting performance requirements of the terminal.

Figure 12:
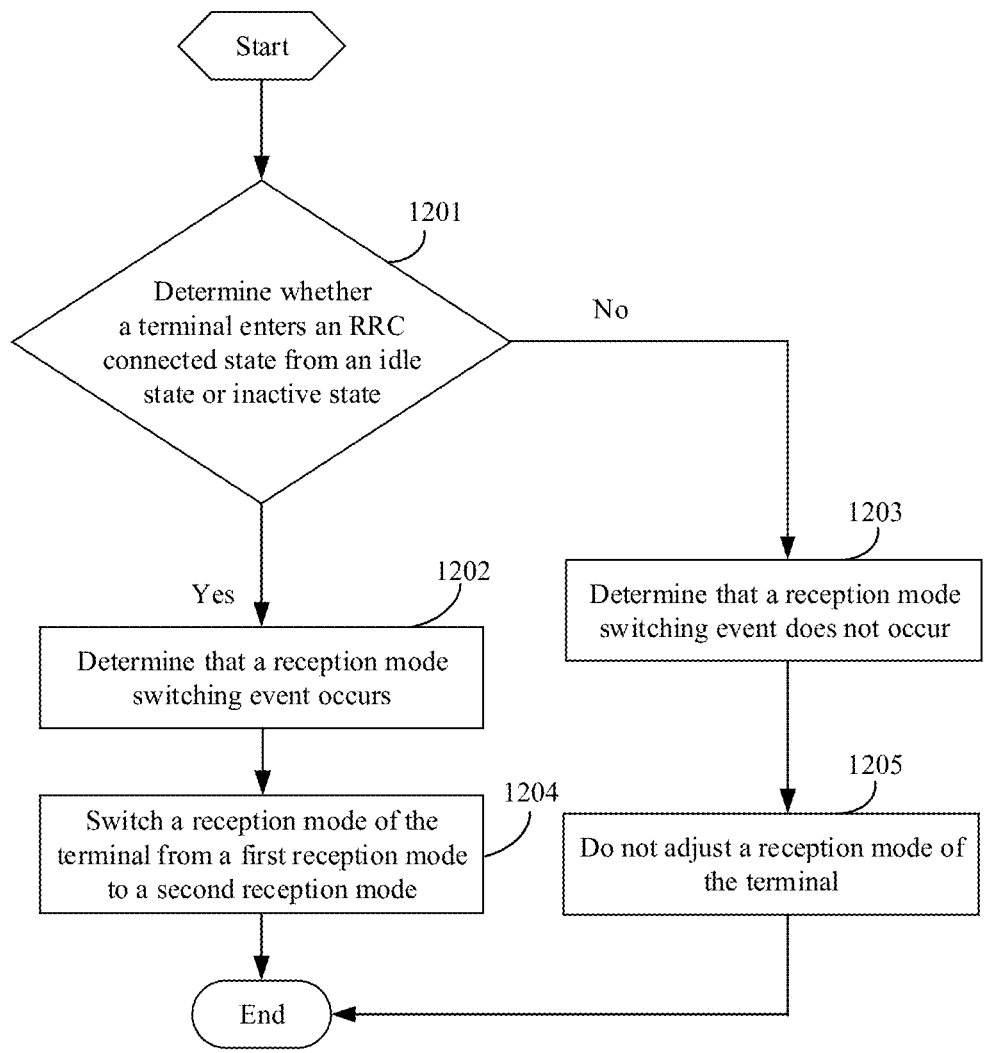
FIG. 12 is a flowchart 11 of a method for reception mode switching according to an embodiment of this disclosure.

Referring to FIG. 12, an embodiment of this disclosure further provides a method for reception mode switching, and the method may be executed by a terminal. Specific steps are as follows:

Step 1201: Determine whether the terminal enters an RRC connected state from an idle state or inactive state, where a first reception mode is configured for the terminal in the idle state or inactive state; and if the terminal enters the RRC connected state from the idle state or inactive state, perform step 1202; otherwise, perform step 1203.

Step 1202: Determine that a reception mode switching event occurs, and then perform step 1204.

Step 1203: Determine that a reception mode switching event does not occur, and then perform step 1205.

Step 1204: Switch a reception mode of the terminal from the first reception mode to a second reception mode.

Optionally, after step 1204, the terminal may transmit related information of the second reception mode to a network side. For example, the terminal notifies the network side (such as a base station) that the terminal has switched to the second reception mode.

Step 1205: Do not adjust the reception mode of the terminal.

For example, the reception mode of the terminal remains the first reception mode, and is not switched to the second reception mode.

The first reception mode corresponds to a first quantity of receiving elements of the terminal, and the second reception mode corresponds to a second quantity of receiving elements of the terminal. The first quantity is less than the second quantity. For example, the first quantity may be 2, and the second quantity may be 4. Certainly, this is not limited thereto. Alternatively, the quantity of receiving elements of the terminal in a first reception mode is the same as the quantity of receiving elements of the terminal in a second reception mode, only different in specific receiving elements. For example, the first reception mode corresponds to a first antenna panel, and the second reception mode corresponds to a second antenna panel.

For example, the terminal in the idle state or inactive state operates at 2Rx and enters the RRC connected state, and then adaptive antenna switching is triggered to switch to 4Rx.

In this embodiment of this disclosure, if the reception mode switching event occurs, the reception mode of the terminal is adjusted by switching from the first reception mode to the second reception mode; and if the reception mode switching event does not occur, the reception mode of the terminal is not adjusted. In this way, reception mode switching is automatically triggered for the terminal by occurrence of the reception mode switching event, thereby reducing signalling of the base station while reducing power consumption of the terminal or meeting performance requirements of the terminal.

Figure 13:
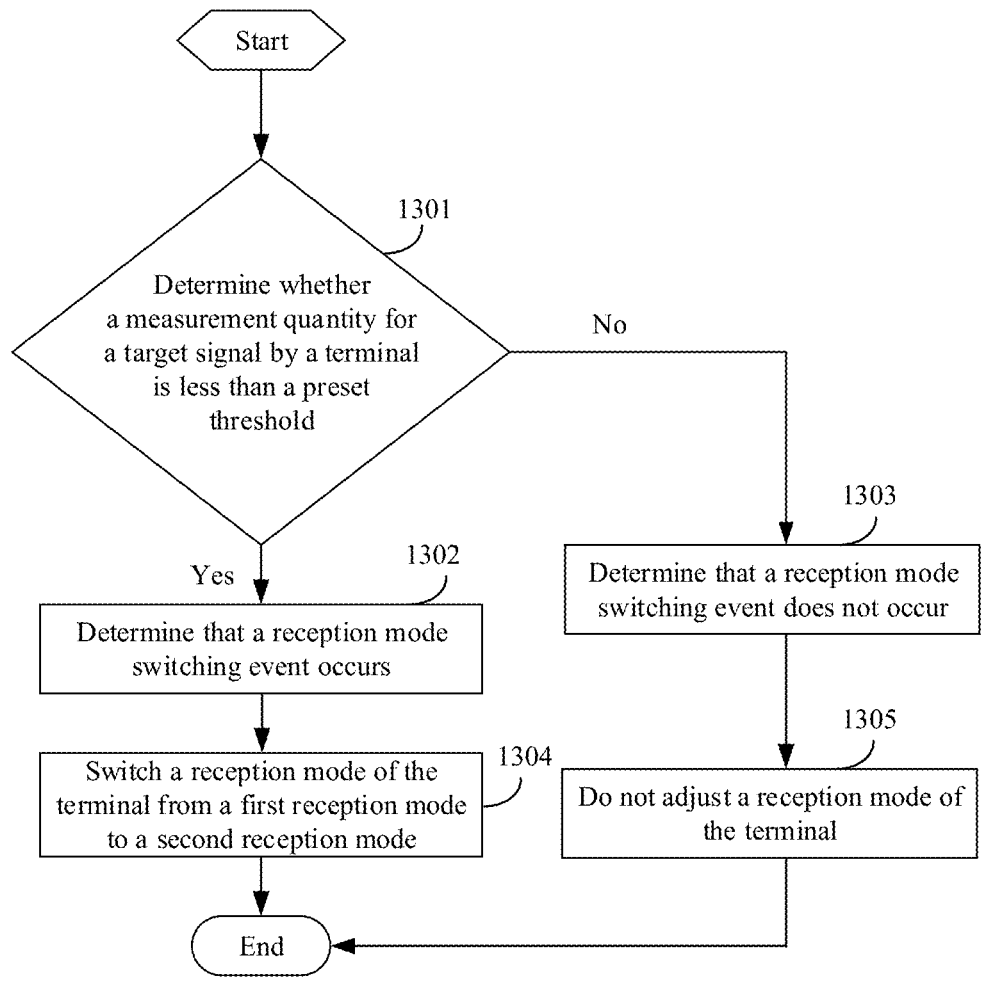
FIG. 13 is a flowchart 12 of a method for reception mode switching according to an embodiment of this disclosure.

Referring to FIG. 13, an embodiment of this disclosure further provides a method for reception mode switching, and the method may be executed by a terminal. Specific steps are as follows:

Step 1301: Determine whether a measurement quantity for a target signal by the terminal is less than a preset threshold, where the terminal operates in a first reception mode, or the terminal is configured with the first reception mode; and if the measurement quantity is less than the preset threshold, perform step 1302; otherwise, perform step 1303.

In this embodiment of this disclosure, the target signal may be a synchronization signal broadcast channel block (SSB), a CSI reference signal (CSI-RS), or the like.

In this embodiment of this disclosure, the measurement quantity may be reference signal received power (RSRP), reference signal received quality (RSRQ), signal to interference plus noise ratio (SINR), or the like.

In this embodiment of this disclosure, the preset threshold is not specifically limited. Optionally, the preset threshold is network-configured or protocol-prescribed.

Step 1302: Determine that a reception mode switching event occurs, and then perform step 1304.

Step 1303: Determine that a reception mode switching event does not occur, and then perform step 1305.

Step 1304: Switch a reception mode of the terminal from the first reception mode to a second reception mode.

Optionally, after step 1304, the terminal may transmit related information of the second reception mode to a network side. For example, the terminal notifies the network side (such as a base station) that the terminal has switched to the second reception mode.

Step 1305: Do not adjust the reception mode of the terminal.

If the measurement quantity for the target signal by the terminal is greater than the preset threshold, it is determined that the reception mode switching event does not occur, and the reception mode of the terminal is not adjusted. For example, the reception mode of the terminal remains the first reception mode, and is not switched to the second reception mode.

The first reception mode corresponds to a first quantity of receiving elements of the terminal, and the second reception mode corresponds to a second quantity of receiving elements of the terminal. The first quantity is less than the second quantity. For example, the first quantity may be 2, and the second quantity may be 4. Certainly, this is not limited thereto. Alternatively, the quantity of receiving elements of the terminal in a first reception mode is the same as the quantity of receiving elements of the terminal in a second reception mode, only different in specific receiving elements. For example, the first reception mode corresponds to a first antenna panel, and the second reception mode corresponds to a second antenna panel.

For example, the base station is configured with 2Rx or the terminal operates at 2Rx. When the measurement quantity (such as RSRP, RSRQ, or SINR) for the target signal (such as SSB or CSI-RS) of the terminal meets a preset condition, for example, if the RSRP, RSRQ, or SINR is less than the preset threshold, adaptive antenna switching is triggered (for example, switching to 4Rx); if the RSRP, RSRQ, or SINR is greater than the preset threshold, 2Rx remains. Optionally, after switching to 4Rx, the terminal reports 4Rx-related information to a gNB.

In this embodiment of this disclosure, if the reception mode switching event occurs, the reception mode of the terminal is adjusted by switching from the first reception mode to the second reception mode; and if the reception mode switching event does not occur, the reception mode of the terminal is not adjusted. In this way, reception mode switching is automatically triggered for the terminal by occurrence of the reception mode switching event, thereby reducing signalling of the base station while reducing power consumption of the terminal or meeting performance requirements of the terminal.

Figure 14:
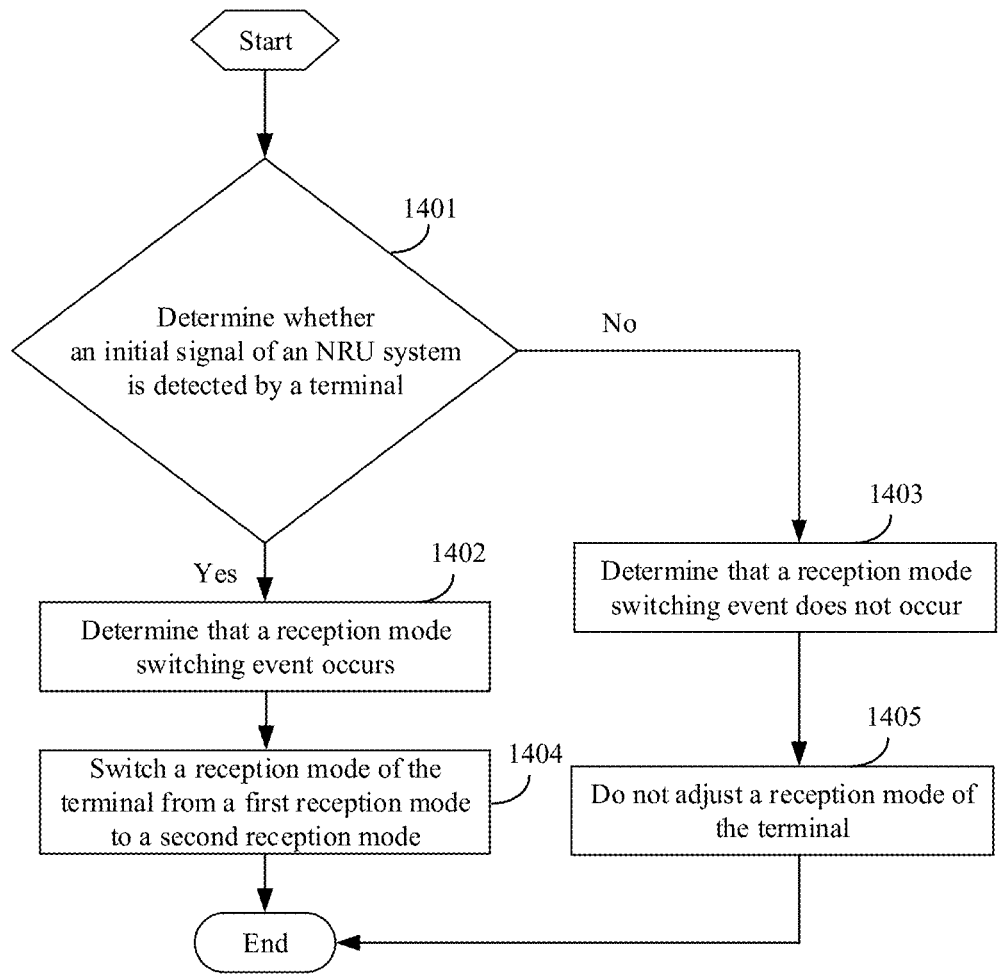
FIG. 14 is a flowchart 13 of a method for reception mode switching according to an embodiment of this disclosure.

Referring to FIG. 14, an embodiment of this disclosure further provides a method for reception mode switching, and the method may be executed by a terminal. Specific steps are as follows:

Step 1401: Determine whether an initial signal (initial signal) of a new radio unlicensed (NR unlicensed, NRU) system is detected by the terminal, where the terminal operates in a first reception mode, or the terminal is configured with the first reception mode; and if the initial signal is detected, perform step 1402; otherwise, perform step 1403.

Step 1402: Determine that a reception mode switching event occurs, and then perform step 1404.

Step 1403: Determine that a reception mode switching event does not occur, and then perform step 1405;

Step 1404: Switch a reception mode of the terminal from a first reception mode to a second reception mode.

Optionally, after step 1404, the terminal may transmit related information of the second reception mode to a network side. For example, the terminal notifies the network side (such as a base station) that the terminal has switched to the second reception mode.

Step 1405: Do not adjust the reception mode of the terminal.

If the initial signal of the NRU system is not detected by the terminal, it is determined that the reception mode switching event does not occur, and the reception mode of the terminal is not adjusted. For example, the reception mode of the terminal remains the first reception mode, and is not switched to the second reception mode.

The first reception mode corresponds to a first quantity of receiving elements of the terminal, and the second reception mode corresponds to a second quantity of receiving elements of the terminal. The first quantity is less than the second quantity. For example, the first quantity may be 2, and the second quantity may be 4. Certainly, this is not limited thereto. Alternatively, the quantity of receiving elements of the terminal in a first reception mode is the same as the quantity of receiving elements of the terminal in a second reception mode, only different in specific receiving elements. For example, the first reception mode corresponds to a first antenna panel, and the second reception mode corresponds to a second antenna panel.

For example, in the new radio unlicensed (NR unlicensed, NRU) system, the base station is configured with 2Rx or the terminal operates at 2Rx, and when the terminal detects the initial signal, adaptive antenna switching is triggered to switch to 4Rx. When the initial signal is not detected by the terminal, 2Rx remains. Optionally, after switching to 4Rx, the terminal may report 4Rx-related information to a gNB.

In this embodiment of this disclosure, if the reception mode switching event occurs, the reception mode of the terminal is adjusted by switching from the first reception mode to the second reception mode; and if the reception mode switching event does not occur, the reception mode of the terminal is not adjusted. In this way, reception mode switching is automatically triggered for the terminal by occurrence of the reception mode switching event, thereby reducing signalling of the base station while reducing power consumption of the terminal or meeting performance requirements of the terminal.

An embodiment of this disclosure further provides a terminal. Because a problem-resolving principle of the terminal is similar to that of the method for reception mode switching in the embodiments of this disclosure, for implementation of the terminal, refer to the implementation of the method. Details are not described again herein.

Figure 15:
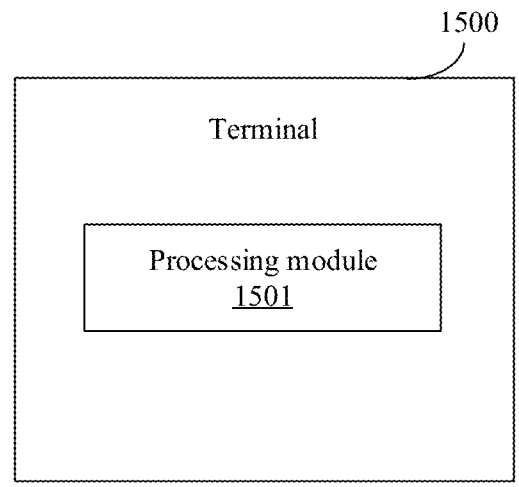
FIG. 15 is a schematic structural diagram 1 of a terminal according to an embodiment of this disclosure.

Referring to FIG. 15, an embodiment of this disclosure further provides a terminal, and the terminal 1500 includes:
a processing module 1501, configured to switch a reception mode of the terminal from a first reception mode to a second reception mode if a reception mode switching event occurs.

In this embodiment of this disclosure, optionally, the processing module 1501 is further configured to not adjust the reception mode of the terminal if the reception mode switching event does not occur.

In this embodiment of this disclosure, optionally, the processing module 1501 is further configured to: if a wake-up signal WUS received by the terminal indicates the terminal to monitor a physical downlink control channel PDCCH within a connected state discontinuous reception CDRX onduration timer, determine that the reception mode switching event occurs, and switch the reception mode of the terminal from the first reception mode to the second reception mode.

Alternatively, in this embodiment of this disclosure, optionally, the processing module 1501 is further configured to: if the wake-up signal WUS received by the terminal indicates the terminal not to monitor the PDCCH within the CDRX onduration timer, or the terminal does not receive the WUS that indicates the terminal to monitor the PDCCH within the CDRX onduration timer, determine that the reception mode switching event does not occur, and not adjust the reception mode of the terminal.

The WUS is received in the first reception mode, and the WUS is associated with the PDCCH within the onduration timer.

In this embodiment of this disclosure, optionally, the processing module 1501 is further configured to: if a connected state discontinuous reception-inactivity timer CDRX-Inactivity timer of the terminal is started, determine that the reception mode switching event occurs, and switch the reception mode of the terminal from the first reception mode to the second reception mode.

Alternatively, in this embodiment of this disclosure, optionally, the processing module 1501 is further configured to: if the CDRX-inactivity timer of the terminal is not started, determine that the reception mode switching event does not occur, and not adjust the reception mode of the terminal.

In this embodiment of this disclosure, optionally, the processing module 1501 is further configured to: if the terminal receives, within a predetermined time, scheduling information carried by a target PDCCH, determine that the reception mode switching event occurs, and switch the reception mode of the terminal from the first reception mode to the second reception mode.

Alternatively, in this embodiment of this disclosure, optionally, the processing module 1501 is further configured to: if the terminal does not receive, within the predetermined time, the scheduling information carried by the target PDCCH, determine that the reception mode switching event does not occur, and not adjust the reception mode of the terminal.

In this embodiment of this disclosure, optionally, CRC of the target PDCCH is scrambled by a C-RNTI or a CS-RNTI.

In this embodiment of this disclosure, optionally, the processing module 1501 is further configured to: if the terminal receives a paging message and the paging message is related to the terminal, determine that the reception mode switching event occurs, and switch the reception mode of the terminal from the first reception mode to the second reception mode.

Alternatively, in this embodiment of this disclosure, optionally, the processing module 1501 is further configured to: if the terminal does not receive the paging message, or the terminal receives the paging message and the received paging message is not related to the terminal, determine that the reception mode switching event does not occur, and not adjust the reception mode of the terminal.

In this embodiment of this disclosure, optionally, the processing module 1501 is further configured to: if a WUS received by the terminal indicates the terminal to monitor a corresponding paging message, determine that the reception mode switching event occurs.

Alternatively, in this embodiment of this disclosure, optionally, the processing module 1501 is further configured to: if the WUS received by the terminal indicates the terminal not to monitor a corresponding paging message, or the terminal does not receive the WUS that indicates the terminal to monitor the corresponding paging message, determine that the reception mode switching event does not occur, and not adjust the reception mode of the terminal.

The WUS is before a paging occasion, and the WUS is associated with the paging occasion.

In this embodiment of this disclosure, optionally, the processing module 1501 is further configured to: if a WUS received by the terminal indicates the terminal to monitor a corresponding paging message and the paging message that is received is related to the terminal, determine that the reception mode switching event occurs.

Alternatively, in this embodiment of this disclosure, optionally, the processing module 1501 is further configured to: if the terminal does not receive the WUS that indicates the terminal to monitor the corresponding paging message, or the WUS received by the terminal indicates the terminal not to monitor the corresponding paging message, or the WUS received by the terminal indicates the terminal to monitor the corresponding paging message, but the paging message that is received is not related to the terminal, determine that the reception mode switching event does not occur, and not adjust the reception mode of the terminal.

The WUS is before a paging occasion, and the WUS is associated with the paging occasion.

In this embodiment of this disclosure, optionally, that the paging message is related to the terminal may include at least one of the following:

the information transmitted on the PDCCH or PDSCH for the paging message includes the information related to the ID of the terminal, the paging message indicates the system information update, the paging message indicates the ETWS, and the paging message indicates the CMAS.

That the paging message is not related to the terminal excludes any one of the following:

the information transmitted on the PDCCH or PDSCH for the paging message includes the information related to the ID of the terminal, the paging message indicates the system information update, the paging message indicates the ETWS, and the paging message indicates the CMAS.

In this embodiment of this disclosure, optionally, the processing module 1501 is further configured to: if a default downlink BWP-related timer of the terminal expires, determine that the reception mode switching event occurs, and switch the reception mode of the terminal from the first reception mode to the second reception mode.

Alternatively, in this embodiment of this disclosure, optionally, the processing module 1501 is further configured to: if the default downlink BWP-related timer of the terminal does not expire, determine that the reception mode switching event does not occur, and not adjust the reception mode of the terminal.

In this embodiment of this disclosure, optionally, the processing module 1501 is further configured to: if the terminal enters an idle state or an inactive state from an RRC connected state, determine that the reception mode switching event occurs, and switch the reception mode of the terminal from the first reception mode to the second reception mode;

or if the terminal enters the RRC connected state from the idle state or the inactive state, determine that the reception mode switching event occurs, and switch the reception mode of the terminal from the first reception mode to the second reception mode.

In this embodiment of this disclosure, optionally, the processing module 1501 is further configured to: if a measurement quantity for a target signal by the terminal is less than a preset threshold, determine that the reception mode switching event occurs, and switch the reception mode of the terminal from the first reception mode to the second reception mode.

Alternatively, in this embodiment of this disclosure, optionally, the processing module 1501 is further configured to: if the measurement quantity for the target signal by the terminal is greater than the preset threshold, determine that the reception mode switching event does not occur, and not adjust the reception mode of the terminal.

The measurement quantity includes at least one of reference signal received power RSRP, reference signal received quality RSRQ, and signal to interference plus noise ratio SINR.

In this embodiment of this disclosure, optionally, the processing module 1501 is further configured to: if an initial signal (initial signal) of a new radio unlicensed NRU system is detected by the terminal, determine that the reception mode switching event occurs, and switch the reception mode of the terminal from the first reception mode to the second reception mode.

Alternatively, in this embodiment of this disclosure, optionally, the processing module 1501 is further configured to: if the initial signal of the NRU system is not detected by the terminal, determine that the reception mode switching event does not occur, and not adjust the reception mode of the terminal.

In this embodiment of this disclosure, optionally, the terminal 1500 further includes: a transmitting module, configured to transmit related information of the second reception mode to a network side.

In this embodiment of this disclosure, optionally, the first reception mode corresponds to a first quantity of receiving elements of the terminal, and the second reception mode corresponds to a second quantity of receiving elements of the terminal.

The receiving element is a receive antenna, a receive antenna port, a receiving port, a receiving channel, a receiving radio frequency channel, or a receive antenna panel.

The terminal provided in this embodiment of this disclosure can execute the foregoing method embodiments, implementation principles and technical effects thereof are similar, and details are not described herein again.

Figure 16:
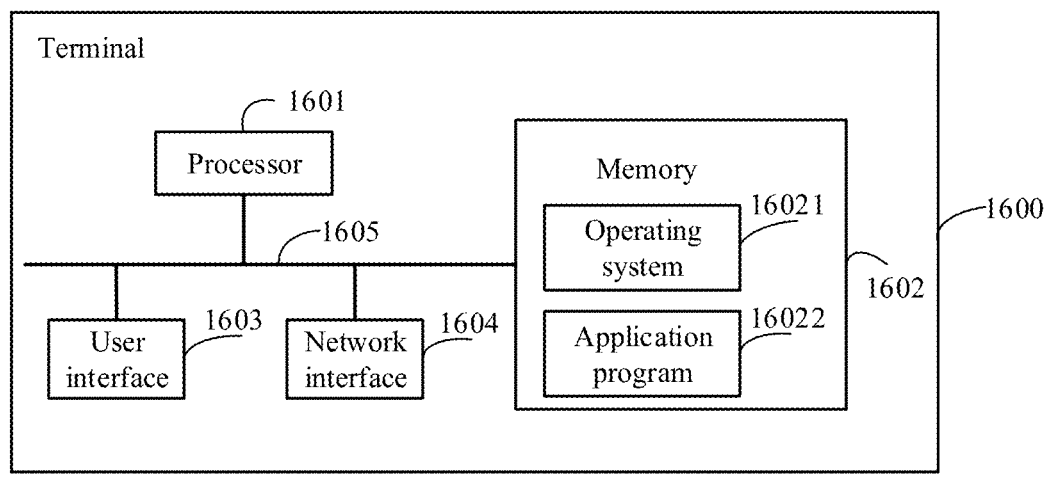
FIG. 16 is a schematic structural diagram 2 of a terminal according to an embodiment of this disclosure.

As shown in FIG. 16, the terminal 1600 shown in FIG. 16 includes at least one processor 1601, a memory 1602, at least one network interface 1604, and a user interface 1603. The components of the terminal 1600 are coupled together by using a bus system 1605. It can be understood that the bus system 1605 is configured to implement connection communication between these components. The bus system 1605 may include not only a data bus but also a power supply bus, a control bus, and a status signal bus. However, for clear description, various buses in FIG. 16 are marked as the bus system 1605.

The user interface 1603 may include a display, a keyboard, a click device (for example, a mouse or a trackball (trackball)), a touch board, or a touchscreen.

It can be understood that the memory 1602 in this embodiment of this disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (Electrically EPROM, EEPROM), or a flash memory. The volatile memory may be a random access memory (RAM), and serves as an external cache. For illustrative rather than limitative description, many forms of RAMs are available, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct memory bus random access memory (Direct Rambus RAM, DR RAM). The memory 1602 in the system and method described in the embodiments of this disclosure is intended to include but is not limited to these and any other suitable types of memories.

In some implementations, the memory 1602 stores the following elements: an executable module or a data structure, or a subset thereof, or an extended set thereof: an operating system 16021 and an application program 16022.

The operating system 16021 includes various system programs, such as a framework layer, a kernel library layer, and a driver layer, and is configured to implement various basic services and process hardware-based tasks. The application program 16022 includes various application programs, such as a media player (Media Player), and a browser (Browser), and is configured to implement various application services. A program that implements the methods of the embodiments of this disclosure may be included in the application program 16022.

In this embodiment of this disclosure, when a program or an instruction stored in the memory 1602, which may be specifically a program or an instruction stored in the application program 16022, is invoked, the following steps are implemented during execution: if a reception mode switching event occurs, switching a reception mode of the terminal from a first reception mode to a second reception mode.

By invoking a program or an instruction stored in the memory 1602, which may be specifically a program or an instruction stored in the application program 16022, the terminal in this embodiment of this disclosure performs the steps of the method embodiments shown in FIG. 1 to FIG. 14, with the same implementation principles and technical effects achieved. Details are not described herein again.

The steps of the method or algorithm described with reference with content disclosed in this disclosure may be implemented in a hardware manner, or may be implemented in a manner in which a processor executes software instructions. The software instruction may include a corresponding software module. The software module may be stored in a Random Access Memory (RAM), a flash memory, a read-only memory (ROM), an erasable programmable read-only memory (Erasable PROM, EPROM), an electrically erasable programmable read-only memory (Electrically EPROM, EEPROM), a register, a hard disk, a removable hard disk, a compact disc read-only memory, or a storage medium in any other forms well-known in the art. For example, a storage medium is coupled to a processor, so that the processor can read information from the storage medium or write information into the storage medium. Certainly, the storage medium may alternatively be a component of the processor. The processor and the storage medium may be located in an application-specific integrated circuit (ASIC). In addition, the ASIC may be located in a core-network interface device. Certainly, the processor and the storage medium may alternatively exist in the core network interface device as discrete components.

A person of skill in the art should be able to realize that in one or more of the foregoing examples, the functions described in this disclosure may be implemented by using hardware, software, firmware, or any combination thereof. When the functions are implemented by software, the functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of this disclosure are further described in detail in the foregoing specific embodiments. It should be understood that the foregoing descriptions are only specific embodiments of this disclosure, but are not intended to limit the protection scope of this disclosure. Any modification, equivalent replacement, or improvement made within the spirit and principle of this disclosure shall fall within the protection scope of this disclosure.

A person skilled in the art should understand that the embodiments of this disclosure may be provided as a method, a system, or a computer program product. Therefore, the embodiments of this disclosure may use a form of hardware only embodiments, software only embodiments, or embodiments with a combination of software and hardware. Moreover, the embodiments of this disclosure may use a form of a computer program product that is implemented on one or more computer-usable storage media (including but not limited to a disk memory, a CD-ROM, an optical memory, and the like) that include computer-usable program code.

The embodiments of this disclosure are described with reference to the flowcharts and/or block diagrams of the method, the device (system), and the computer program product according to the embodiments of this disclosure. It should be understood that computer program instructions may be used to implement each process and/or each block in the flowcharts and/or the block diagrams, or a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

It can be understood that the embodiments described in this disclosure may be implemented by hardware, software, firmware, middleware, microcode, or a combination thereof. For hardware implementation, the processing unit may be implemented in one or more application specific integrated circuits (ASIC), digital signal processors (DSP), digital signal processing devices (DSP Device, DSPD), programmable logic devices (PLD), field-programmable gate arrays (FPGA), general-purpose processors, controllers, microcontrollers, microprocessors, and other electronic units for performing the functions described in this disclosure, or a combination thereof.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the embodiments of this disclosure without departing from the spirit and scope of this disclosure. This disclosure is intended to cover these modifications and variations provided that the modifications and variations in the embodiments of this disclosure fall within the protection scope defined by the following claims and their equivalent technologies.

What is claimed is:

1. A method for reception mode switching, applied to a terminal and comprising:
   switching a reception mode of the terminal from a first reception mode to a second reception mode when a reception mode switching event occurs, or skipping switching the reception mode of the terminal when the reception mode switching event does not occur,
   wherein the switching a reception mode of the terminal from a first reception mode to a second reception mode when a reception mode switching event occurs comprises:
   when a default downlink bandwidth part (default Downlink BWP)-related timer of the terminal expires, determining that the reception mode switching event occurs, and switching the reception mode of the terminal from the first reception mode to the second reception mode; and
   transmitting to a network side related information of the second reception mode that is switched to;
   wherein skipping switching the reception mode of the terminal when the reception mode switching event does not occur comprises:
   when the default downlink BWP-related timer of the terminal does not expire, determining that the reception mode switching event does not occur, and skipping adjusting the reception mode of the terminal,
   wherein the first reception mode corresponds to a first quantity of receiving elements of the terminal, and the second reception mode corresponds to a second quantity of receiving elements of the terminal; wherein the receiving element is a receive antenna, a receive antenna port, a receiving port, a receiving channel, a receiving radio frequency channel, or a receive antenna panel.

2. The method according to claim 1, wherein,
   the switching a reception mode of the terminal from a first reception mode to a second reception mode when a reception mode switching event occurs further comprises at least one of the following:
   when a wake-up signal (WUS) received by the terminal indicates the terminal to monitor a physical downlink control channel (PDCCH) within a connected state discontinuous reception (CDRX) onduration timer, determining that the reception mode switching event occurs, and switching the reception mode of the terminal from the first reception mode to the second reception mode;
   when a connected state discontinuous reception-inactivity timer (CDRX-Inactivity timer) of the terminal is started, determining that the reception mode switching event occurs, and switching the reception mode of the terminal from the first reception mode to the second reception mode;
   when the terminal receives, within a predetermined time, scheduling information carried by a target PDCCH, determining that the reception mode switching event occurs, and switching the reception mode of the terminal from the first reception mode to the second reception mode;
   when the terminal receives a paging message and the paging message is related to the terminal, determining that the reception mode switching event occurs, and switching the reception mode of the terminal from the first reception mode to the second reception mode;

when a WUS received by the terminal indicates the terminal to monitor a corresponding paging message, determining that the reception mode switching event occurs, and switching the reception mode of the terminal from the first reception mode to the second reception mode;

when a WUS received by the terminal indicates the terminal to monitor a corresponding paging message and the paging message that is received is related to the terminal, determining that the reception mode switching event occurs;

when the terminal enters an idle state or an inactive state from an RRC connected state, determining that the reception mode switching event occurs, and switching the reception mode of the terminal from the first reception mode to the second reception mode;

when the terminal enters the RRC connected state from the idle state or the inactive state, determining that the reception mode switching event occurs, and switching the reception mode of the terminal from the first reception mode to the second reception mode;

when a measurement quantity for a target signal by the terminal is less than a preset threshold, determining that the reception mode switching event occurs, and switching the reception mode of the terminal from the first reception mode to the second reception mode; or when an initial signal (initial signal) of a new radio unlicensed NRU system is detected by the terminal, determining that the reception mode switching event occurs, and switching the reception mode of the terminal from the first reception mode to the second reception mode.

3. The method according to claim 2, wherein the measurement quantity comprises at least one of reference signal received power (RSRP), reference signal received quality (RSRQ), and signal to interference plus noise ratio (SINR).

4. The method according to claim 2, wherein cyclic redundancy check (CRC) of the target PDCCH is scrambled by a cell radio network temporary identifier (C-RNTI) or a configuration scheduling radio network temporary identifier (CS-RNTI).

5. The method according to claim 2, wherein that the paging message is related to the terminal comprises at least one of the following:
information transmitted on a PDCCH or PDSCH for the paging message comprises information related to an identifier ID of the terminal, the paging message indicates a system information update, the paging message indicates an earthquake and tsunami warning system (ETWS), and the paging message indicates a commercial mobile alarm system (CMAS); and
that the paging message is not related to the terminal excludes any one of the following:
the information transmitted on the PDCCH or PDSCH for the paging message comprises the information related to the ID of the terminal, the paging message indicates the system information update, the paging message indicates the ETWS, and the paging message indicates the CMAS.

6. The method according to claim 1, wherein,
the skipping adjusting the reception mode of the terminal when the reception mode switching event does not occur comprises at least one of the following:
when a wake-up signal (WUS) received by the terminal indicates the terminal not to monitor a physical downlink control channel (DCCH) within a connected state discontinuous reception (CDRX) onduration timer, or the terminal does not receive the WUS that indicates the terminal to monitor the PDCCH within the CDRX onduration timer, determining that the reception mode switching event does not occur, and skipping adjusting the reception mode of the terminal;

when a connected state discontinuous reception-inactivity timer (CDRX-inactivity timer) of the terminal is not started, determining that the reception mode switching event does not occur, and skipping adjusting the reception mode of the terminal;

when the terminal does not receive, within the predetermined time, the scheduling information carried by the target PDCCH, determining that the reception mode switching event does not occur, and skipping adjusting the reception mode of the terminal, when the terminal does not receive the paging message, or the terminal receives the paging message and the received paging message is not related to the terminal, determining that the reception mode switching event does not occur, and skipping adjusting the reception mode of the terminal;

when the WUS received by the terminal indicates the terminal not to monitor a corresponding paging message, or the terminal does not receive the WUS that indicates the terminal to monitor the corresponding paging message, determining that the reception mode switching event does not occur, and skipping adjusting the reception mode of the terminal;

when the WUS received by the terminal indicates the terminal not to monitor the corresponding paging message, or the terminal does not receive the WUS that indicates the terminal to monitor the corresponding paging message, or the WUS received by the terminal indicates the terminal to monitor the corresponding paging message, but the paging message that is received is not related to the terminal, determining that the reception mode switching event does not occur, and skipping adjusting the reception mode of the terminal;

when the measurement quantity for the target signal by the terminal is greater than the preset threshold, determining that the reception mode switching event does not occur, and skipping adjusting the reception mode of the terminal; or when the initial signal of a new radio unlicensed (NRU) system is not detected by the terminal, determining that the reception mode switching event does not occur, and skipping adjusting the reception mode of the terminal.

7. A terminal, comprising a processor, a memory, and a program stored in the memory and capable of running on the processor, wherein when the program is executed by the processor, the processor is configured to implement following step:
switching a reception mode of the terminal from a first reception mode to a second reception mode when a reception mode switching event occurs, or skipping switching the reception mode of the terminal when the reception mode switching event does not occur,
the switching a reception mode of the terminal from a first reception mode to a second reception mode when a reception mode switching event occurs comprises:
when a default downlink bandwidth part (default Downlink BWP)-related timer of the terminal expires, determining that the reception mode switching event occurs, and switching the reception mode of the terminal from the first reception mode to the second reception mode, and transmitting, to a network side, related information of the second reception mode that is switched to;

wherein skipping switching th reception mode of the terminal when the reception mode switching event does not occur comprises:

when the default downlink BWP-related timer of the terminal does not expire, determining that the reception mode switching event does not occur, and skipping adjusting the reception mode of the terminal;

wherein the first reception mode corresponds to a first quantity of receiving elements of the terminal, and the second reception mode corresponds to a second quantity of receiving elements of the terminal; wherein the receiving element is a receive antenna, a receive antenna port, a receiving port, a receiving channel, a receiving radio frequency channel, or a receive antenna panel.

8. The terminal according to claim 7, the processor is configured to implement following step:

skipping switching the reception mode of the terminal when the reception mode switching event does not occur.

9. The terminal according to claim 7, wherein, the switching a reception mode of the terminal from a first reception mode to a second reception mode when a reception mode switching event occurs further comprises at least one of the following:

when a wake-up signal (WUS) received by the terminal indicates the terminal to monitor a physical downlink control channel (PDCCH) within a connected state discontinuous reception (CDRX) onduration timer, determining that the reception mode switching event occurs, and switching the reception mode of the terminal from the first reception mode to the second reception mode;

when a connected state discontinuous reception-inactivity timer (CDRX-Inactivity timer) of the terminal is started, determining that the reception mode switching event occurs, and switching the reception mode of the terminal from the first reception mode to the second reception mode;

when the terminal receives, within a predetermined time, scheduling information carried by a target PDCCH, determining that the reception mode switching event occurs, and switching the reception mode of the terminal from the first reception mode to the second reception mode;

when the terminal receives a paging message and the paging message is related to the terminal, determining that the reception mode switching event occurs, and switching the reception mode of the terminal from the first reception mode to the second reception mode;

when a WUS received by the terminal indicates the terminal to monitor a corresponding paging message, determining that the reception mode switching event occurs, and switching the reception mode of the terminal from the first reception mode to the second reception mode;

when a WUS received by the terminal indicates the terminal to monitor a corresponding paging message and the paging message that is received is related to the terminal, determining that the reception mode switching event occurs;

when the terminal enters an idle state or an inactive state from an RRC connected state, determining that the reception mode switching event occurs, and switching the reception mode of the terminal from the first reception mode to the second reception mode;

when the terminal enters the RRC connected state from the idle state or the inactive state, determining that the reception mode switching event occurs, and switching the reception mode of the terminal from the first reception mode to the second reception mode;

when a measurement quantity for a target signal by the terminal is less than a preset threshold, determining that the reception mode switching event occurs, and switching the reception mode of the terminal from the first reception mode to the second reception mode; or when an initial signal (initial signal) of a new radio unlicensed NRU system is detected by the terminal, determining that the reception mode switching event occurs, and switching the reception mode of the terminal from the first reception mode to the second reception mode.

10. The terminal according to claim 8, wherein, the skipping adjusting the reception mode of the terminal when the reception mode switching event does not occur comprises at least one of the following:

when a wake-up signal (WUS) received by the terminal indicates the terminal not to monitor a physical downlink control channel (PDCCH) within a connected state discontinuous reception (CDRX) onduration timer, or the terminal does not receive the WUS that indicates the terminal to monitor the PDCCH within the CDRX onduration timer, determining that the reception mode switching event does not occur, and skipping adjusting the reception mode of the terminal;

when a connected state discontinuous reception-inactivity timer (CDRX-inactivity timer) of the terminal is not started, determining that the reception mode switching event does not occur, and skipping adjusting the reception mode of the terminal;

when the terminal does not receive, within the predetermined time, the scheduling information carried by the target PDCCH, determining that the reception mode switching event does not occur, and skipping adjusting the reception mode of the terminal;

when the terminal does not receive the paging message, or the terminal receives the paging message and the received paging message is not related to the terminal, determining that the reception mode switching event does not occur, and skipping adjusting the reception mode of the terminal;

when the WUS received by the terminal indicates the terminal not to monitor a corresponding paging message, or the terminal does not receive the WUS that indicates the terminal to monitor the corresponding paging message, determining that the reception mode switching event does not occur, and skipping adjusting the reception mode of the terminal;

when the WUS received by the terminal indicates the terminal not to monitor the corresponding paging message, or the terminal does not receive the WUS that indicates the terminal to monitor the corresponding paging message, or the WUS received by the terminal indicates the terminal to monitor the corresponding paging message, but the paging message that is received is not related to the terminal, determining that the reception mode switching event does not occur, and skipping adjusting the reception mode of the terminal;

when the measurement quantity for the target signal by the terminal is greater than the preset threshold, determining that the reception mode switching event does not occur, and skipping adjusting the reception mode of the terminal; or when the initial signal of a new radio unlicensed (NRU) system is not detected by the terminal, determining that the reception mode switching event does not occur, and skipping adjusting the reception mode of the terminal.

11. The terminal according to claim 9, wherein the measurement quantity comprises at least one of reference signal received power (RSRP), reference signal received quality (RSRQ), and signal to interference plus noise ratio (SINR).

12. The terminal according to claim 9, wherein cyclic redundancy check (CRC) of the target PDCCH is scrambled by a cell radio network temporary identifier (C-RNTI) or a configuration scheduling radio network temporary identifier (CS-RNTI).

13. The terminal according to claim 9, wherein that the paging message is related to the terminal comprises at least one of the following:

information transmitted on a PDCCH or PDSCH for the paging message comprises information related to an identifier ID of the terminal, the paging message indicates a system information update, the paging message indicates an earthquake and tsunami warning system (ETWS), and the paging message indicates a commercial mobile alarm system (CMAS); and that the paging message is not related to the terminal excludes any one of the following:

the information transmitted on the PDCCH or PDSCH for the paging message comprises the information related to the ID of the terminal, the paging message indicates the system information update, the paging message indicates the ETWS, and the paging message indicates the CMAS.

14. A non-transitory computer-readable storage medium, wherein a computer program is stored in the computer-readable storage medium, and when the computer program is executed by a processor, the processor is configured to implement following step:

switching a reception mode of the terminal from a first reception mode to a second reception mode when a reception mode switching event occurs, or skipping switching the reception mode of the terminal when the reception mode switching event does not occur, wherein when the computer program is executed by the processor, the processor is configured to implement:

when a default downlink bandwidth part (default Downlink BWP)-related timer of the terminal expires, determining that the reception mode switching event occurs, and switching the reception mode of the terminal from the first reception mode to the second reception mode; and transmitting, to a network side, related information of the second reception mode that is switched to;

wherein when the computer program is executed by the processor, the processor is configured to implement:

when the default downlink BWP-related timer of the terminal does not expire, determining that the reception mode switching event does not occur, and skipping adjusting the reception mode of the terminal wherein the first reception mode corresponds to a first quantity of receiving elements of the terminal, and the second reception mode corresponds to a second quantity of receiving elements of the terminal; wherein the receiving element is a receive antenna, a receive antenna port, a receiving port, a receiving channel, a receiving radio frequency channel, or a receive antenna panel.

15. The computer-readable storage medium according to claim 14, wherein when the computer program is executed by the processor, the processor is configured to further implement at least one of the following:

when a wake-up signal (WUS) received by the terminal indicates the terminal to monitor a physical downlink control channel (PDCCH) within a connected state discontinuous reception (CDRX) onduration timer, determining that the reception mode switching event occurs, and switching the reception mode of the terminal from the first reception mode to the second reception mode;

when a connected state discontinuous reception-inactivity timer (CDRX-Inactivity timer) of the terminal is started, determining that the reception mode switching event occurs, and switching the reception mode of the terminal from the first reception mode to the second reception mode;

when the terminal receives, within a predetermined time, scheduling information carried by a target PDCCH, determining that the reception mode switching event occurs, and switching the reception mode of the terminal from the first reception mode to the second reception mode;

when the terminal receives a paging message and the paging message is related to the terminal, determining that the reception mode switching event occurs, and switching the reception mode of the terminal from the first reception mode to the second reception mode;

when a WUS received by the terminal indicates the terminal to monitor a corresponding paging message, determining that the reception mode switching event occurs, and switching the reception mode of the terminal from the first reception mode to the second reception mode;

when a WUS received by the terminal indicates the terminal to monitor a corresponding paging message and the paging message that is received is related to the terminal, determining that the reception mode switching event occurs;

when the terminal enters an idle state or an inactive state from an RRC connected state, determining that the reception mode switching event occurs, and switching the reception mode of the terminal from the first reception mode to the second reception mode;

when the terminal enters the RRC connected state from the idle state or the inactive state, determining that the reception mode switching event occurs, and switching the reception mode of the terminal from the first reception mode to the second reception mode;

when a measurement quantity for a target signal by the terminal is less than a preset threshold, determining that the reception mode switching event occurs, and switching the reception mode of the terminal from the first reception mode to the second reception mode; or when an initial signal (initial signal) of a new radio unlicensed NRU system is detected by the terminal, determining that the reception mode switching event occurs, and switching the reception mode of the terminal from the first reception mode to the second reception mode.

* * * * *